(12) United States Patent
Suzuki et al.

(10) Patent No.: US 7,051,100 B2
(45) Date of Patent: May 23, 2006

(54) DATA COMMUNICATION APPARATUS AND DATA COMMUNICATION METHOD

(75) Inventors: Yasuhiro Suzuki, Tokyo (JP); Hiroshi Yoshida, Tokyo (JP)

(73) Assignee: Mitsububishi Denki Kabushiki Kaisha, Tokyo (JP)

(*) Notice: Subject to any disclaimer, the term of this patent is extended or adjusted under 35 U.S.C. 154(b) by 750 days.

(21) Appl. No.: 10/137,428

(22) Filed: May 3, 2002

(65) Prior Publication Data
US 2003/0093461 A1    May 15, 2003

(30) Foreign Application Priority Data
Nov. 15, 2001 (JP) .............................. 2001-349963

(51) Int. Cl.
*G06F 15/173* (2006.01)
(52) U.S. Cl. ........................ 709/224; 709/225; 709/231
(58) Field of Classification Search ........ 709/201–203, 709/217–219, 223–225, 229–231
See application file for complete search history.

(56) References Cited

U.S. PATENT DOCUMENTS

| | | | |
|---|---|---|---|
| 5,918,002 A | 6/1999 | Klemets et al. | |
| 6,199,107 B1 | 3/2001 | Dujari | |
| 6,651,103 B1* | 11/2003 | Markowitz et al. | 709/231 |
| 6,665,304 B1* | 12/2003 | Beck et al. | 370/401 |
| 2002/0073084 A1* | 6/2002 | Kauffman et al. | 707/10 |
| 2003/0005455 A1* | 1/2003 | Bowers | 725/90 |
| 2003/0033606 A1* | 2/2003 | Puente et al. | 725/110 |

FOREIGN PATENT DOCUMENTS

EP    0 915 598 A2    5/1999

(Continued)

OTHER PUBLICATIONS

Zink, Michael et al.; "LC-RTP (Loss Collection RTP) : Reliability for Video Caching in the Internet;" KOM-Industrial Process and System Communications and IPSI, German National Research Center for Information Technology; 2000; pp. 281-286.

(Continued)

*Primary Examiner*—Glenn Burgess
*Assistant Examiner*—Yasin M. Barqadle
(74) *Attorney, Agent, or Firm*—Birch, Stewart Kolasch & Birch, LLP

(57) ABSTRACT

The present invention aims to perform streaming delivery with compensating missing data when a part of the streaming data of the streaming delivery is missing. On receiving a delivery request to a media server from a client, a cache checking unit checks if the streaming data to be delivered is stored in a cache data storing unit. If not stored, the cache checking unit sends the delivery request to the media server, and a streaming data caching unit receives the streaming data delivered from the media server and judges an existence of missing data within the delivered streaming data. If exists, a missing data requesting unit sends a delivery request for the missing data to the media server, and a streaming data delivering unit performs the streaming delivery of the streaming data and the missing data received from the media server to the client.

14 Claims, 9 Drawing Sheets

FOREIGN PATENT DOCUMENTS

| | | |
|---|---|---|
| JP | 2000-57072 | 2/2000 |
| JP | 2000-293424 | 10/2000 |
| JP | 2001-69485 | 3/2001 |
| JP | 2001-75850 | 3/2001 |
| WO | WO 99/08193 A1 | 2/1999 |
| WO | WO 01/55860 A1 | 8/2001 |
| WO | WO 01/67223 A1 | 9/2001 |

OTHER PUBLICATIONS

C. Perkins et al., "A Survey of Packet Loss Recovery Techniques for Streaming Audio," IEEE Network, IEEE Inc., New York, vol. 12, No. 5, Sep. 1998, pp. 40-48. XP000875014.

* cited by examiner

DATA COMMUNICATION APPARATUS AND DATA COMMUNICATION METHOD

BACKGROUND OF THE INVENTION

1. Field of the Invention

The present invention relates to a streaming delivery system, in which a client who reproduces streaming data and a media server for distributing the streaming data are connected by at least one kind of network, and in which a cache server is located in the network between the client and the media server, and relates to a cache server apparatus and cache method for dispersing a load of the media server and reducing congestion of the network between the client and the media server by caching the streaming data with the cache server.

The network which delivers the streaming data includes, for example, the Internet, digital TV networks, satellite communication, and any other kinds of communication means, regardless of wired or wireless.

2. Description of the Related Art

In the streaming delivery system through the network, the streaming data delivered by the media server is precisely divided and delivered according to the communication rule. As the client receives the divided data, the client reproduces the data.

The cache server apparatus which is located between the client and the media server, caches the streaming data sent/received between the client and the media server, and delivers cached streaming data instead of the media server in response to a request for the same streaming data by another client.

In this way, it is avoidable that too many requests from clients gather at the media server, and it is possible to reduce a traffic load of the network.

The Japanese Unexamined Patent Publication No. 2001-69485 discloses a proxy server, which operates in the above way, for a video-on-demand system through the network.

The streaming data is not static data, so that, generally, it is necessary to send/receive a predetermined amount of data within a predetermined time. For example, the media data having a predetermined reproducing time such as video or sound is delivered from the media server with keeping real time, and the client reproduces the streaming data, as it receives the streaming data delivered from the media server.

An apparatus and a method for caching the streaming data, considering a characteristics of the streaming data, is disclosed in the Japanese Unexamined Patent Publication No. 2000-293242. According to this invention, in case of caching the streaming data in response to the request from the client, if the request from the client is suspended, instead of the client, the cache server apparatus obtains data of a time period of the streaming data and stores in the cache.

PROBLEMS TO BE SOLVED BY THE INVENTION

Generally, in case of the streaming delivery, the real-time reproduction of the data in response to the request from the client is important, so that the streaming delivery is usually performed based on the communication rule which is suitable for keeping the real time.

However, such a communication rule simplifies a sending/receiving process by eliminating a process for checking if the data is received by the recipient and so on, but on the contrary, it is not guaranteed that the delivered streaming data reaches the recipient.

Consequently, there is a possibility that a part of data becomes missing depending on the congestion status of the network.

According to the related art, in case of caching the streaming data, if a part of data is missing as described above, the cache server stores the streaming data except the missing data in the cache, and makes it as cache data. In this case, the stored cache data lacks the missing data compared with the streaming data delivered from the media server. At this stage, if another client requests for the streaming delivery of the same streaming data, the cache server apparatus cannot deliver the streaming data. In another way, the streaming data in which the missing data is lacked is delivered from the cache server. Both create problems.

Further, a media file stored in the media server for streaming delivery normally contains plural pieces of streaming data having related contents. For example, one media file contains plural pieces of streaming data having the same contents but different qualities. With this kind of the media file, from plural pieces of streaming data having different qualities, at least one streaming data is selected and delivered according to the band width of the network used for the streaming delivery or a purpose of using the streaming data at the client. The data of the best quality may be selected automatically from various conditions by the media server or the client, or a specific piece of data is selected intentionally by the user regardless of conditions. In addition to the above, the media file can contain multi-angle video data taken from multiple angles, static image data related to a motion picture, and so on. Also in this case, the media server only delivers the streaming data requested by the client.

Here, only one piece of streaming data out of plural pieces of streaming data contained in one media file is delivered from the media server, on one request from one client, so that the cache server apparatus according to the related art stores only one piece of streaming data delivered by the media server in the cache. Namely, the streaming data which relates to the requested streaming data is not stored in the cache.

Under this condition, even if another client requests for the streaming data in the same media file, the streaming data stored in the cache may not match the request of the client. For example, if the band width of the network to which the client belongs is narrow, the streaming data stored in the cache cannot be applied to the client, because the network of the client cannot hold the quality (transfer ratio) of the streaming data stored in the cache.

Accordingly, there are problems that the cache server apparatus cannot perform streaming delivery, or even if the cache server apparatus performs streaming delivery, the client cannot reproduce the streaming data sufficiently.

Since ADSL (Asymmetric Digital Subscriber Line), CATV (Cable TV) Internet connection service, FTTH (Fiber To The Home), etc. have been spread among common families, a high-speed connection to ISP (Internet Service Provider), which is an initial connection point, can be performed. Because of this, it becomes possible to reproduce at a relatively high speed the media file stored in the media server of ISP, with which each user makes a contract.

However, if the user wants to reproduce the media file at the media server in a distance, the data from the media file should be transferred through multiple networks which constitute the Internet, so that it is not avoidable for the data to be transferred through probable congested networks.

Therefore, it is difficult to secure the band width to transfer the data, that is, it is difficult to directly receive or reproduce the media file containing data of a motion picture or sound which is constructed in time series and the real-time reproduction is required.

The present invention is provided to solve the above problems. The invention aims to implement, for example, a cache server system which provides the same service as the media server by storing the file having the same contents as the media file stored in the media server even if a part of data is lost at the streaming delivery.

Further, another object of the present invention is, for example, to implement a cache server system which provides the service of the same quality as the media server by storing the media file including plural pieces of related streaming data in the cache as a cache file based on a request from one client as a trigger.

Further, the present invention is applicable to the broadcast or multicast. Namely, the present invention aims to implement a cache server system which stores in the cache the streaming data delivered from the media server (e.g., TV broadcasting station, the Internet broadcasting station) even with no request from any client, and performs streaming delivery of the stored streaming data in response to the request from the client.

SUMMARY OF THE INVENTION

According to the present invention, a data communication apparatus for performing communication between a terminal device requesting streaming delivery of a piece of information data and a delivering apparatus holding at least one piece of information data and performing the streaming delivery of the information data requested by the terminal device, the data communication apparatus includes:

a data storing unit available to store any piece of the information data;

a delivery request receiving unit for receiving a delivery request of the streaming delivery of specific information data from the terminal device;

a data checking unit for checking if requested information data of which the streaming delivery is requested by the delivery request is stored in the data storing unit, and sending the delivery request to the delivering apparatus if the requested information data is not stored in the data storing unit;

a data receiving unit for receiving delivered requested information data which is the requested information data delivered from the delivering apparatus, and judging an existence of missing data within the delivered requested information data;

a data delivering unit for performing the streaming delivery of the delivered requested information data received by the data receiving unit to the terminal device; and a missing data notifying unit for sending a missing data notice for informing of the missing data within the delivered requested information data, when the missing data is detected within the delivered requested information data by the data receiving unit.

According to another aspect of the invention, a data communication apparatus performing communication between a terminal device requesting streaming delivery of a piece of information and a delivering apparatus holding at least one piece of information data and performing the streaming delivery of the information data requested by the terminal device, the data communication apparatus includes:

a data storing unit available to store any piece of the information data;

a delivery request receiving unit for receiving a delivery request of the streaming delivery of specific information data from the terminal device;

a data checking unit for checking if requested information data of which the streaming delivery is requested by the delivery request is stored in the data storing unit, and sending the delivery request to the delivering apparatus if the requested information data is not stored in the data storing unit;

a data receiving unit for receiving delivered requested information data which is the requested information data delivered from the delivering apparatus, and judging an existence of missing data within the delivered requested information data;

a data delivering unit for performing the streaming delivery of the delivered requested information data received by the data receiving unit to the terminal device;

a missing data transmission requesting unit for sending a missing data transmission request to the delivering apparatus for requesting a transmission of the missing data within the delivered requested information data, when the missing data is detected within the delivered requested information data by the data receiving unit; and a missing data receiving unit for receiving the missing data from the delivering apparatus, and in the data communication apparatus, the data storing unit stores the delivered requested information data received by the data receiving unit, and stores the missing data received by the missing data receiving unit with relating the missing data to the delivered requested information data.

In the data communication apparatus,
the data receiving unit receives the delivered requested information data with judging an existence of the missing data, and
the missing data transmission requesting unit sends the missing data transmission request to the delivering apparatus at a time when the data receiving unit detects the missing data within the delivered requested information data.

In the data communication apparatus,
the data receiving unit receives the delivered requested information data with judging an existence of the missing data, stores the delivered requested information data in the data storing unit in an order of receiving the delivered requested information data, and suspends a process of storing the delivery requested data in the data storing unit at a time when the missing data is detected within the delivered requested information data, and restarts the process of storing the delivery requested data in the data storing unit after the missing data has been stored in the data storing unit.

In the data communication apparatus,
when the missing data is detected by the data receiving unit, the missing data transmission requesting unit sends the missing data transmission request to the delivering apparatus after the data storing unit has stored the delivered requested information data.

In the data communication apparatus,
when the delivered requested information data is stored in the data storing unit, the data delivering unit performs the streaming delivery of the delivered requested information data stored in the data storing unit to the terminal device.

According to another aspect of the invention, a data communication apparatus for performing communication between a terminal device requesting streaming delivery of a piece of information and a delivering apparatus holding at least one piece of information data and performing the streaming delivery of the information data requested by the terminal device, the data communication apparatus includes:

a data storing unit available to store any piece of the information data;

a delivery request receiving unit for receiving a delivery request of the streaming delivery of specific information data from the terminal device;

a data checking unit for checking if requested information data of which the streaming delivery is requested by the delivery request is stored in the data storing unit;

a missing data judging unit for judging an existence of missing data within the requested information data stored when the requested information data is stored in the data storing unit;

a missing data transmission requesting unit for sending a missing data transmission request to the delivering apparatus for requesting transmission of the missing data within the stored requested information data, when the missing data within the stored requested information data is detected by the missing data judging unit;

a missing data receiving unit for receiving the missing data delivered from the delivering apparatus; and a data delivering unit for performing the streaming delivery of the stored requested information data and the missing data received by the missing data receiving unit to the terminal device.

In the data communication apparatus, the data storing unit stores the missing data received by the missing data receiving unit with relating the missing data to the stored requested information data, and the data delivering unit performs the streaming delivery of the stored requested information data and the missing data stored in the data storing unit to the terminal device.

According to another aspect of the invention, a data communication apparatus for performing communication between a terminal device requesting streaming delivery of a piece of information data and a delivering apparatus holding at least one information data file which includes at least one piece of information data and performing the streaming delivery of the information data requested by the terminal device, the data communication apparatus includes:

a data storing unit available to store any of the information data file;

a delivery request receiving unit for receiving a delivery request of the streaming delivery of specific information data from the terminal device;

a data checking unit for checking if an information data file including requested information data of which the streaming delivery is requested by the delivery request is stored in the data storing unit, and sending the delivery request to the delivering unit if the information data file including the requested information data is not stored in the data storing unit;

a related data delivery requesting unit for judging if requested information data file which includes the requested information data includes other data than the requested information data at the delivering apparatus when the information data file including the requested information data is not stored in the data storing unit, and sending a related data delivery request to the delivering apparatus for requesting the streaming delivery of other data as related data relating to the requested information data when the requested information data file includes other data;

a data receiving unit for receiving the requested information data delivered from the delivering apparatus in response to the delivery request, and receiving the related data delivered from the delivering apparatus in response to the related data delivery request;

a data delivering unit performing the streaming delivery of the requested information data received by the data receiving unit to the terminal device, and in the data communication apparatus, the data storing unit stores the requested information data received by the data receiving unit, and stores the related data received by the data receiving unit with relating the related data to the requested information data.

In the data communication apparatus, when the information data file includes other information data than the requested information data, the data receiving unit receives other information data delivered as the related data.

In the data communication apparatus, when the information data file includes appended data other than the requested information data, the data receiving unit receives the appended data delivered as the related data.

In the data communication apparatus, the delivering apparatus holds attribute information showing data included in the information data file for each of the information data file held in the delivering apparatus, the data communication apparatus further comprises:

an attribute information transmission requesting unit for sending an attribute information transmission request to the delivering apparatus for requesting the attribute information of the requested information data file; and an attribute information receiving unit for receiving the attribute information of the requested information data file from the delivering apparatus, and in the data communication apparatus, the related data delivery requesting unit judges if the requested information data file includes other data than the requested information data based on the attribute information of the requested information data file received by the attribute information data receiving unit.

In the communication apparatus, delivering apparatus specifies a data format for each of the information data file and holds the information data file in the data format specified, the data communication apparatus further comprises a data converting unit for converting the data format of the requested information data and the related data received by the data receiving unit and generating a corresponding information data file which is the information data file including the requested information data and the related data after converting the data format and having same data format as the requested information data file, and the data storing unit stores the corresponding information data file generated by the data converting unit.

In the communication apparatus, the delivering apparatus holds attribute information showing the data format of each of the information data file held, the data communication apparatus further comprises:

an attribute information transmission requesting unit for sending an attribute transmission request to the delivering apparatus for requesting transmission of the attribute information of the requested information data file; and an attribute information receiving unit for receiving the attribute information of the requested information data file from the delivering apparatus, and the data converting unit converts the data format of the requested information data and the related data received by the data receiving unit based on the attribute information of the requested information data file received by the attribute information receiving unit.

In the data communication apparatus, the data delivering unit performs the streaming delivery of the requested information data of which the data format has been converted included in the corresponding information data file stored in the data storing unit to the terminal device.

In the data communication apparatus, when the information data file including the requested information data is stored in the data storing unit, the data delivering unit performs the streaming delivery of the requested information data from the data storing unit to the terminal device.

In the data communication apparatus, before the data storing unit finishes storing the delivered requested information data, the delivery request receiving unit receives the delivery request of the delivered requested information data from a new terminal device other than the terminal device, and then the data storing unit finishes storing the delivered requested information data without storing a part of the delivered requested information data, the data delivering unit performs the streaming delivery of the delivered requested information data except an unstored part which has not been stored in the data storing unit to the new terminal device, the data checking unit sends an unstored part delivery request for requesting the streaming delivery of the unstored part to the delivering apparatus, the data receiving unit receives the unstored part delivered from the delivering apparatus, and the data delivering unit performs the streaming delivery of the unstored part received by the data receiving unit to the new terminal device.

According to another aspect of the invention, a data communication method for performing communication between a terminal device for requesting streaming delivery of a piece of information data and a delivering apparatus holding at least one piece of information data and performing the streaming delivery of the information data requested by the terminal device, the method includes:

recording any piece of the information data;

receiving a delivery request of the streaming delivery of specific information data from the terminal device;

checking if requested information data of which the streaming delivery is requested by the delivery request is recorded by the recording, and sending the delivery request to the delivering apparatus if the requested information data is not recorded by the recording;

receiving delivered requested information data which is the requested information data delivered from the delivering apparatus;

judging an existence of missing data within the delivered requested information data;

performing the streaming delivery of the delivered requested information data received by the receiving to the terminal device; and sending a missing data notice for informing of the missing data within the delivered requested information data, when the missing data is detected within the delivered requested information data by the judging.

According to another aspect of the invention, a data communication method for performing communication between a terminal device requesting streaming delivery of a piece of information data and a delivering apparatus holding at least one piece of information data and performing the streaming delivery of the information data requested by the terminal device, the method comprising:

recording any piece of the information data;

receiving a delivery request of the streaming delivery of specific information data from the terminal device;

checking if requested information data of which the streaming delivery is requested by the delivery request is recorded by the recording, and sending the delivery request to the delivering apparatus if the requested information data is not recorded by the recording;

receiving delivered requested information data which is the requested information data delivered from the delivering apparatus;

judging an existence of missing data within the delivered requested information data;

performing the streaming delivery of the delivered requested information data received by the receiving to the terminal device;

sending a missing data transmission request to the delivering apparatus for requesting a transmission of the missing data within the delivered requested information data, when the missing data is detected within the delivered requested information data by the judging; and receiving the missing data from the delivering apparatus, and in the data communication apparatus, the recording records the delivered requested information data received by the receiving, and records the missing data received by the receiving with relating the missing data to the delivered requested information data.

According to another aspect of the invention, a data communication method for performing communication between a terminal device requesting streaming delivery of a piece of information data and a delivering apparatus holding at least one piece of information data and performing the streaming delivery of information data requested by the terminal device, the method includes:

recording any piece of the information data;

receiving a delivery request of the streaming delivery of specific information data from the terminal device;

checking if requested information data of which the streaming delivery is requested by the delivery request is recorded by the recording;

judging an existence of missing data within the recorded requested information data when the requested information data is recorded by the recording;

sending a missing data transmission request to the delivering apparatus for requesting transmission of the missing data within the recorded requested information data, when the missing data within the recorded requested information data is detected by the judging;

receiving the missing data delivered from the delivering apparatus; and performing the streaming delivery of the recorded requested information data and the missing data received by the receiving to the terminal device.

According to another aspect of the invention, a data communication method for performing communication between a terminal device requesting streaming delivery of a piece of information data and a delivering apparatus holding at least one information data file which includes at least one piece of information data and performing the streaming delivery of the information data requested by the terminal device, the method includes:

recording any of the information data file;

receiving a delivery request of the streaming delivery of specific information data from the terminal device;

checking if an information data file including requested information data of which the streaming delivery is requested by the delivery request is recorded by the recording, and sending the delivery request to the delivering apparatus if the information data file including the requested information data is not recorded by the recording;

judging if required information data file which includes the requested information data includes other data than the requested information data at the delivering apparatus when the information data file including the requested information data is not recorded by the recording, and sending a related data delivery request to the delivering apparatus for requesting the streaming delivery of other data as related data relating to the requested information data when the requested information data file includes other data;

receiving the requested information data delivered from the delivering apparatus in response to the delivery request, and receiving the related data delivered from the delivering apparatus in response to the related data delivery request;

performing the streaming delivery of the requested information data received by the receiving to the terminal device, and in the data communication method, the recording records the requested information data received by the receiving, and records the related data received by the receiving with relating the related data to the requested information data.

BRIEF EXPLANATION OF THE DRAWINGS

A complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Embodiment 1.

Figure 1:
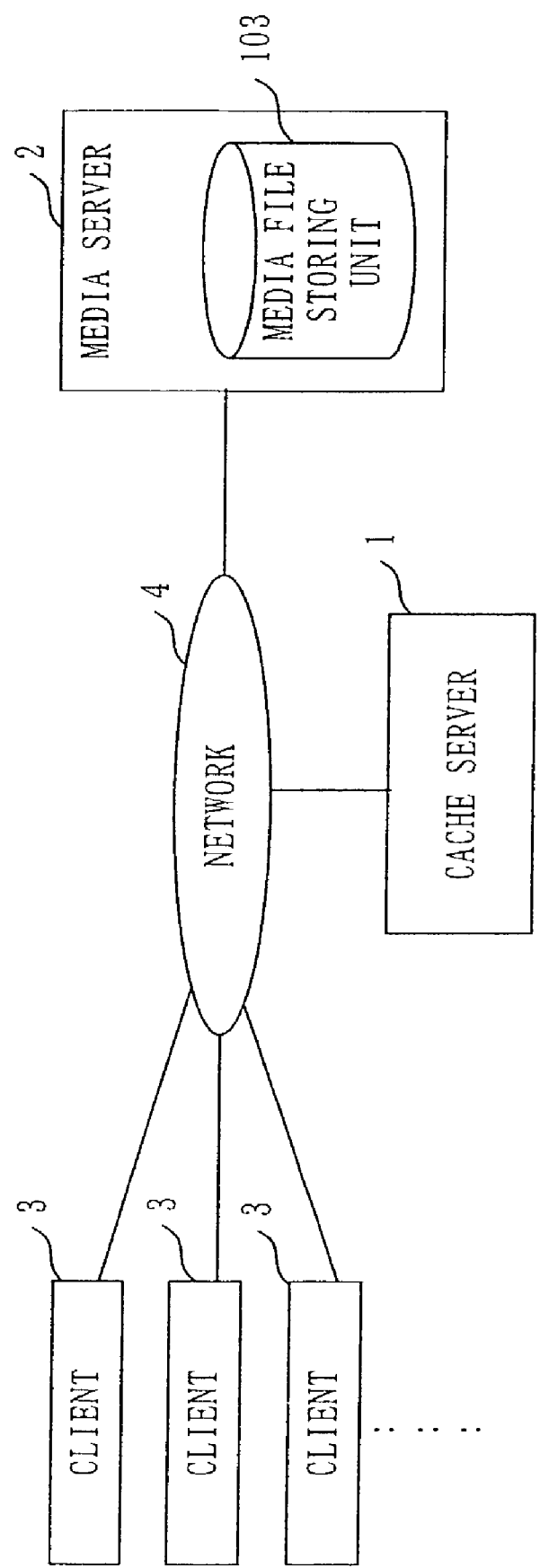
FIG. 1 shows a configuration of a network according to the first through eighth embodiments.

FIG. 1 is a diagram showing network configuration to which a cache server of the invention is applied.

In FIG. 1, a reference numeral 1 shows a cache server, 2 shows a media server, 3 shows a client, and 4 shows a network.

The media server 2, the client 3, the cache server 1 are connected to the network 4. This network 4 includes any kinds of communication tools regardless of wired or wireless such as the Internet, the digital TV networks, satellite communication. One network can be connected to multiple clients, media servers, and cache servers, and further, multiple networks can be connected to each device.

The media server 2 holds at least one media file in a media file storing unit 103. The media server 2 receives a request from the client 3 through the network 4, and performs streaming delivery to the client 3 using the media file. At this time, the data for the streaming delivery is referred to as streaming data.

Actually, the data delivered from the media server 2 is referred to as delivered streaming data.

The media file stored in the media file storing unit 103 of the media server 2 may contain multiple pieces of related streaming data. Concretely, one media file includes multiple pieces of streaming data having the same contents but different qualities, or one media file includes multi-angle video data taken from multiple angles and static image data related to a motion picture, and so on.

Further, the streaming data is mainly data having a certain time period such as video or sound, however, the streaming data can be static data such as static image or text.

The media server 2 corresponds to a delivering apparatus, the streaming data corresponds to information data and the media file corresponds to a information data file.

The client 3 sends a request for streaming delivery to the media server 2 through the network 4, and the client as well receives, reproduces, and displays the delivered streaming data delivered from the media server 2.

The client 3 corresponds to a terminal device.

Further, the streaming data of which the streaming delivery is requested corresponds to requested information data.

The cache server 1 stores in the cache the media file or the streaming data requested by the client 3, and performs streaming delivery in response to the delivery request by the client using the media file or the streaming data stored in the cache.

The media file stored in the cache is called as a cache file, and the streaming data stored in the cache is called as cache data.

The cache server 1 corresponds to a data communication apparatus.

Figure 2:
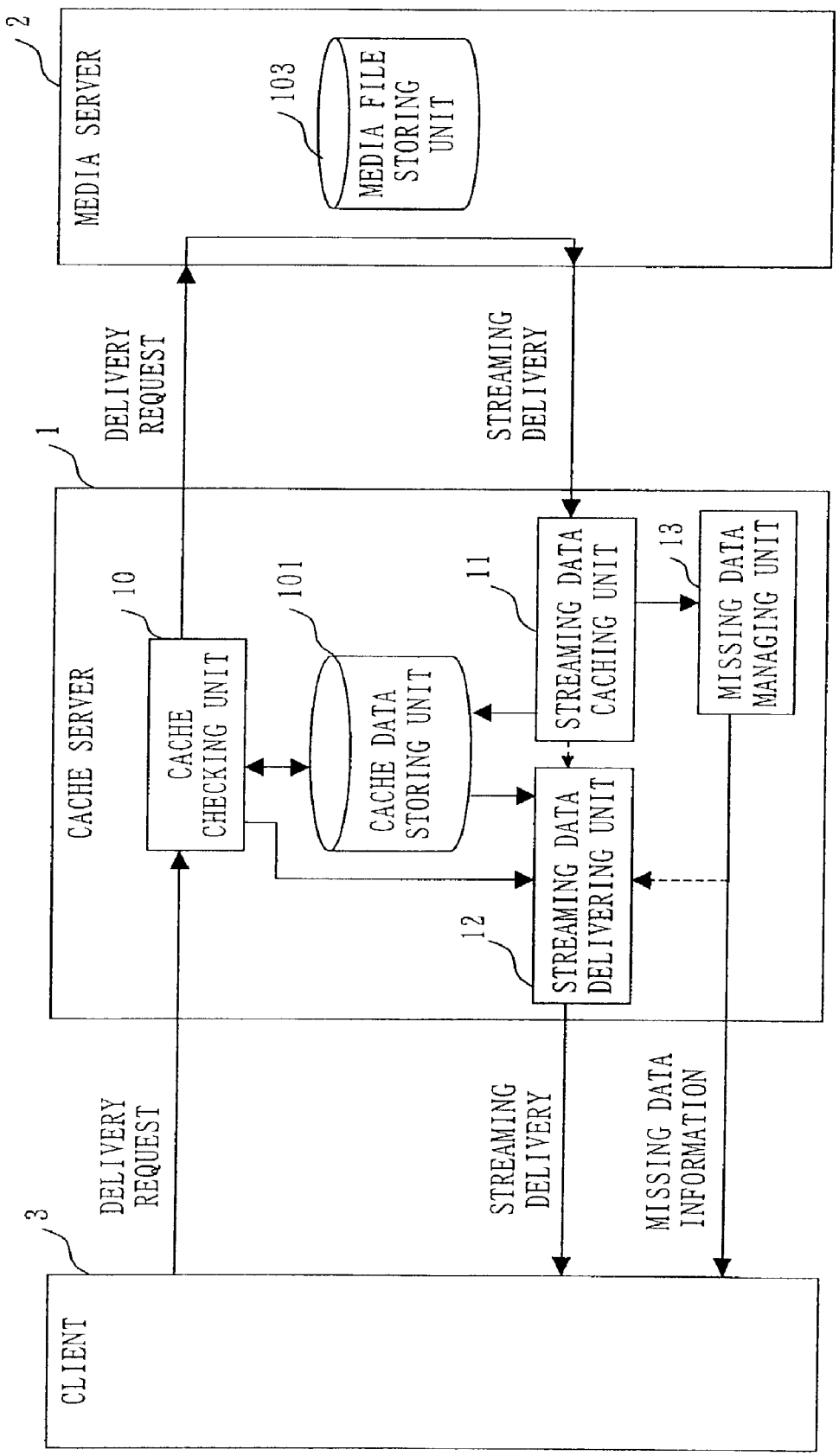
FIG. 2 shows a processing flow according to the first embodiment of the invention.

The following explains an internal configuration of the cache server 1 in reference to FIG. 2.

The cache server 1 includes a cache checking unit 10, a streaming data caching unit 11, a streaming data delivering unit 12, a missing data managing unit 13, and a cache data storing unit 101.

On receiving a delivery request from the client 3, the cache checking unit 10 checks if the streaming data (requested information data) requested by the client 3 is stored as the cache data in the cache data storing unit 101.

Further, the cache checking unit 10 also manages information of the location of the streaming data requested by the client 3. Here, the information of the location means a name of the server, a name of media file, and so on.

When the streaming data requested by the client 3 is stored in the cache data storing unit 101 as the cache data, the cache checking unit 10 calls the streaming data delivering unit 12 in order to deliver the requested streaming data to the client 3. When the streaming data requested by the client 3 is not stored in the cache data storing unit 101 as the cache data, the cache checking unit 10 sends the delivery request by the client to the media server 2, makes the media server 2 perform the streaming delivery, and obtains the streaming data delivered from the media data 2 as the cache data.

Here, the cache checking unit 10 corresponds to a delivery request receiving unit and a data checking unit.

On receiving the delivered streaming data (delivered requested information data) delivered from the media server 2, the streaming data caching unit 11 stores the delivered streaming data received in the cache data storing unit 101.

After storing the delivered streaming data in the cache data storing unit 101, the process is transferred to the streaming data delivering unit 12. Here, the process is transferred to the streaming data delivering unit 12 at timing of each pause of the streaming data or each frame of the motion picture.

Further, the streaming data caching unit 11 checks an existence of missing data within the delivered streaming data, and if there exists, the streaming data caching unit 11 notifies the missing data managing unit 113 of information of the missing data.

Here, the streaming data caching unit 11 corresponds to a data receiving unit.

In response to the request for delivery from the client, the streaming data delivering unit 12 performs the streaming delivery to the client using the cache data stored in the cache data storing unit 101. In another way, the streaming data delivering unit 12 can receive the streaming data, which has been delivered from the media server 2, directly from the streaming data caching unit, and deliver the streaming data to the client 3.

Here, the streaming data delivering unit 12 corresponds to a data delivering unit.

The missing data managing unit 13 manages information of a part of the streaming data delivered from the media server 2 which has not reached the cache server 1, namely, information of missing data.

As for the contents of information of the missing data, a name of the media server and a name of the media file stored in the media server, a position of missing data in the streaming data. The missing data managing unit 13 makes the client directly recognize the information of the missing data managed by the missing data managing unit 13. Concretely, the missing data managing unit 13 sends a missing data notice informing of the contents of the missing data to the client 3.

In another way, the missing data managing unit 13 notifies the streaming data delivering unit 12 and makes the streaming data delivering unit 12 perform the streaming delivery except the missing data.

The missing data managing unit 13 corresponds to a missing data notifying unit.

The cache data storing unit 101 receives the streaming data delivered from the media server 2 and stores the streaming data as the cache data.

Here, the cache data storing unit 101 corresponds to a data storing unit.

The cache server 1 can be implemented by a computer having, for example, a CPU such as a micro-processor, a recording unit such as a semiconductor memory, a magnetic disk, and a communication unit, not shown in the figure. The recording unit stores a program for implementing functions of each element included in the cache server 1, the CPU can control the operation of the cache server 1 by reading the program, which enables to implement the function of each element.

The operation will be explained in the following.

First, the client 3 sends a delivery request for the streaming data in the media file to the media server 2.

Whenever the delivery request for the streaming data is sent to the media server 2 from the client 3, the request reaches the cache server 1.

The cache checking unit 10 receives the delivery request and checks if the requested streaming data is stored in the cache data storing unit 101 or not.

When the streaming data requested by the client is stored in the cache data storing unit 101 (in case of "hit"), the cache checking unit 10 transfers the delivery request to the streaming data delivering unit 12, and the streaming data delivering unit 12 performs the streaming delivery to the client 3 instead of the media server 2 using the cache data stored in the cache data storing unit 101.

When the streaming data requested by the client is not stored in the cache data storing unit 101, the cache checking unit 10 sends the delivery request from the client to the media server 2.

The media server 2 receives the delivery request from the client and delivers the requested streaming data.

The streaming data delivered from the media server 2 always reach the cache server. In the cache server, the streaming data caching unit 11 receives the streaming data delivered from the media server 2 and stores the streaming data in the cache data storing unit 101.

In parallel with the above operation, the streaming data delivering unit 12 performs the streaming delivery to the client 3 using the streaming data stored in the cache data storing unit. In another way, the streaming data caching unit 11 can send the streaming data delivered from the media server directly to the streaming data delivering unit 12 without storing the streaming data in the cache data storing unit 101, and the streaming data delivering unit can perform the streaming delivery to the client 3.

Further, the streaming data caching unit 11 checks an existence of missing data within the streaming data delivered from the media server 2.

When the missing data is detected, information of the missing data is sent to the missing data managing unit 13. The missing data managing unit 13 receives the information of the missing data and performs communication directly to the client to make the client recognize the missing data. Concretely, a missing data notice notifying of identification of the missing data is sent to the client 3.

In another way, the missing data notice can be transferred to the streaming data delivering unit 12, and the streaming data delivering unit 12 can deliver the streaming data except the missing data to the client 3.

As discussed above, even if missing data exists within the streaming data delivered from the media server, an occurrence of the missing data is notified to the client by the cache server. Accordingly, the client can skip the missing data when the client browses the delivered streaming data, or the client can request the media server to resend the streaming data.

The more the client requests, the more possibility increases that the cache server obtains the missing data from the media server. It becomes possible for the cache server to store the missing data in the cache without a particular request for the missing data to the media server.

As has been described, according to the first embodiment, even if the missing data exists within the streaming data delivered from the media server (delivering apparatus), the cache server (data communication apparatus) can recognize the missing data and make the client (terminal device) recognize the missing data. Accordingly, when the streaming data (information data) is, for example, a motion picture and so on, even if a part of the streaming data is missing, the client (terminal device) can easily perform processes such as skipping the reproduction process, requesting the missing data from the media server (delivering apparatus), which enables an effective reproduction of the streaming data.

Embodiment 2.

Figure 3:
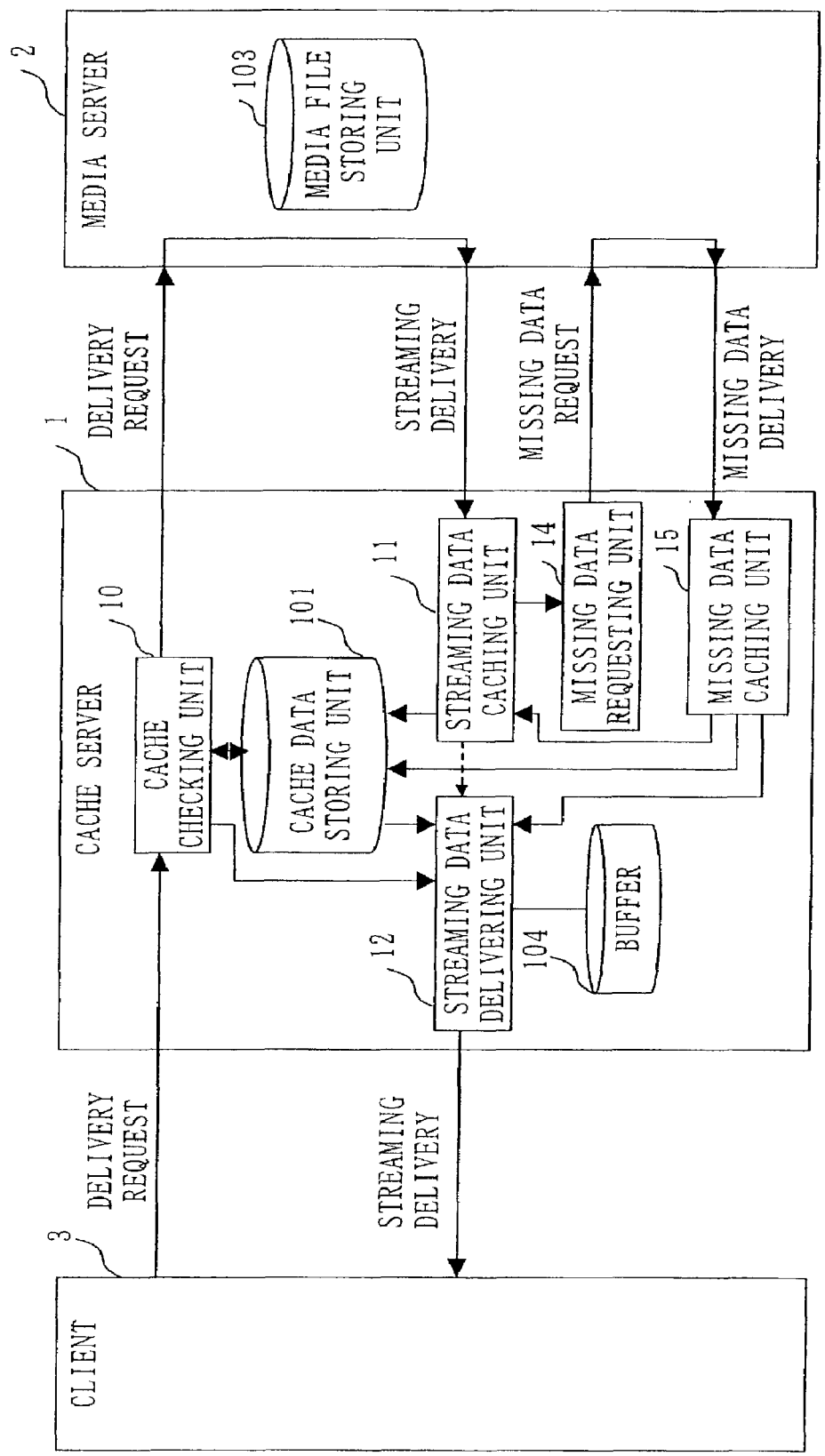
FIG. 3 shows a processing flow according to the second embodiment of the invention.

First, an internal configuration of the cache server 1 according to the second embodiment is explained referring to FIG. 3.

In FIG. 3, the cache server 1, the media server 2, the client 3, the cache checking unit 10, the streaming data caching unit 11, the streaming data delivering unit 12, and the cache data storing unit 101 are the same as ones shown in FIG. 2 according to the first embodiment.

In the figure, a reference numeral 14 shows a missing data requesting unit, which requests a delivery of missing data by sending a missing data delivery request (missing data transmission request) to the media server 2 based on the missing data information transferred from the streaming data caching unit 11 when the missing data is detected within the delivered streaming data. The missing data delivery request is issued by directly specifying a position of the missing data within the delivered streaming data, however, the missing data can be specified by a time from the initial data of the streaming data, or specified by a corresponding frame if the streaming data is a motion picture.

The missing data requesting unit corresponds to a missing data transmission requesting unit.

A reference numeral 15 shows a missing data caching unit, which receives the missing data delivered from the media server 2 and stores the missing data in the cache data storing unit 101.

When the missing data is stored in the cache data storing unit 101, the received missing data and the streaming data except the missing data are composed and stored. In another way, the missing data can be stored as a single unit without composing with the streaming data originally delivered. In this case of storing the missing data as a single unit, another processing is required that the missing data caching unit 15 informs the cache checking unit 10 of the missing data being stored as a single unit, and instructs the cache checking unit 10 to handle the missing data and the streaming data originally delivered as if they were stored in the cache data storing unit as one streaming data.

Here, the missing data caching unit 15 corresponds to a missing data receiving unit.

A reference numeral 104 shows a buffer, which is a memory device used by the streaming data delivering unit 12 for temporarily storing the streaming data when the streaming data delivering unit 12 delivers the streaming data to the client 3.

In the present embodiment, the streaming data caching unit 11 receives the streaming data delivered from the media server 2 with judging an existence of missing data and sequentially stores the delivered streaming data in the cache data storing unit 101 in an order of receiving the delivered streaming data.

In the following, an operation will be explained.

The operation of each unit is the same as one in the first embodiment when there is no missing data within the streaming data delivered from the media server 2.

On detecting the missing data within the delivered streaming data from the media server 2, the streaming data caching unit 11 suspends storing the delivered streaming data in the cache data storing unit 101 and informs the missing data requesting unit 14 of the missing data to make the media server 2 deliver the missing data. At this time, the streaming data delivering unit 12 performs the streaming delivery using the buffer 104 which stores the delivered streaming data instead of the cache data storing unit 101. The streaming data delivering unit 12 can continue to deliver the streaming data by obtaining the streaming data from the buffer 104 even if the streaming data is temporarily suspended to store in the cache data storing unit 101.

On receiving the missing data delivered from the media server 2, the missing data caching unit 15 stores the missing data in the cache data storing unit 101, releases the temporary suspension of storing the streaming data in the streaming data caching unit 11, and instructs the streaming data caching unit 11 to restart to store the streaming data delivered from the media server 2 in the cache data storing unit 101. At the same time, if the operation of the streaming data delivering unit 12 has been temporarily suspended, the missing data caching unit 15 releases the temporary suspension of the operation of the streaming data delivering unit 12.

As discussed above, in the present embodiment, the cache server is able to continue to store the streaming data in the cache with compensating the missing data by immediately obtaining the missing data from the media server even if a part of data is missing within the streaming data delivered from the media server.

It is also possible for the cache server to perform the streaming delivery to the client using the buffer without temporarily suspending the delivery even if a part of the data is missing.

It is also possible for the cache server to perform the streaming delivery using the cache data with compensating the missing data when another client sends another delivery request.

As has been described, according to the second embodiment, even if the missing data exists within the streaming data delivered from the media server (delivering apparatus), the cache server (data communication apparatus) can immediately recognize the missing data, request the missing data from the media server (delivering apparatus), obtain and store the missing data. Accordingly, it can be said that no data is missing practically between the cache server (data communication apparatus) and the media server (delivering apparatus). Consequently, missing data may occur only between the client (terminal device) and the cache server (data communication apparatus). That is, an occurrence probability of the missing data can be reduced in a whole system of the streaming delivery. When the performance of the network such as a band width is wide and a transmission rate is high between the cache server (data communication apparatus) and the client (terminal device) it is advantageous that the occurrence probability of the missing data is almost eliminated.

Embodiment 3.

Figure 4:
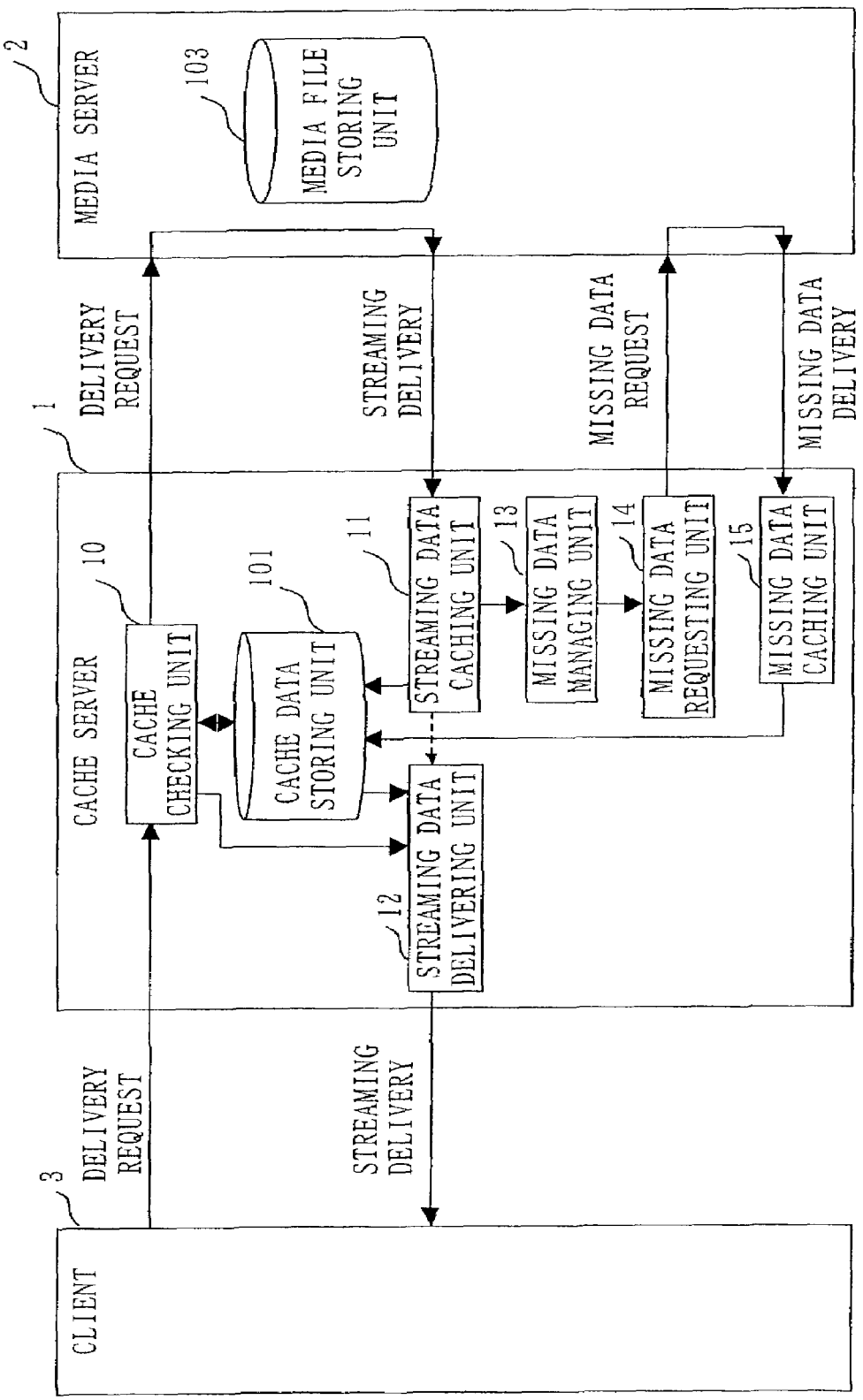
FIG. 4 shows a processing flow according to the third embodiment of the invention.

FIG. 4 shows an internal configuration of the cache server 1 according to the third embodiment.

In the figure, the cache server 1, the media server 2, the client 3, the cache checking unit 10, the streaming data caching unit 11, the streaming data delivering unit 12, the missing data managing unit 13, the cache data storing unit 101 are the same as ones shown in FIG. 2 according to the first embodiment.

Further, the missing data requesting unit 14 and the missing data caching unit 15 are the same as ones shown in FIG. 3 according to the second embodiment.

According to the present embodiment, the missing data managing unit 13 calls the missing data requesting unit 14 for prompting the media server 2 to deliver the missing data, however, timings for calling the missing data requesting unit 14 can be scheduled, or the missing data requesting unit can be called at timing of an optimal condition after the missing data managing unit 13 checks the load of the media server, the load of the traffic of the network, and so on.

Next, the operations will be described.

The operation of each unit is the same as one of the first embodiment when there is no missing data within the streaming data delivered from the media server 2.

On detecting an existence of the missing data within the streaming data delivered from the media server 2, the streaming data caching unit 11 sends information of the missing data to the missing data managing unit 13.

At this time, the missing data exists, however, the cache data storing unit can continue to store the data and the streaming delivery to the client can be also continued by the streaming data delivering unit 12.

When the streaming delivery from the media server 2 is finished, the missing data managing unit 13 transfers the missing data information to the missing data requesting unit 14, and the missing data requesting unit 14 sends a missing data delivery request to the media server to make the media server deliver the missing data.

Here, timing for calling the missing data requesting unit 14 can be a time when a predetermined length of time passed from a time of the missing data being detected, a certain time at night, when the load of the media server is small, when the traffic load of the network between the media server and the cache server is small, and so on.

The missing data caching unit 15 receives the missing data delivered from the media server 2, composes the missing data with the cache data stored in the cache data storing unit 101, consequently the cache data with compensating the missing data is obtained.

As described above, even if a part of the streaming data delivered from the media server is missing, the missing data can be obtained from the media server at a predetermined timing and the streaming data with compensating the missing data can be stored.

Accordingly, when another client sends another deliver request, it is also possible for the cache server to perform streaming delivery using the cache data with compensating the missing data.

Further, according to the third embodiment, even if a part of the streaming data (information data) of which the delivery is requested by the client, delivered from the media server (delivering apparatus) is missing, the cache server (data communication apparatus) can obtain the missing data effectively and compensate the requested information data with the obtained missing data by requesting the delivery of the missing data when, for example, the load of the media server (delivering apparatus) is low or the traffic load of the network is low. Therefore, it is advantageous that the requested streaming data (information data) can be compensated with the missing data without taking a load on the media server (delivering apparatus) or the traffic of the network, a hit ratio of the information data can be increased, and the load of the media server (delivering apparatus) and the traffic of the network between the media server (delivering apparatus) and the cache server (data communication apparatus) can be reduced.

Embodiment 4.

Figure 5:
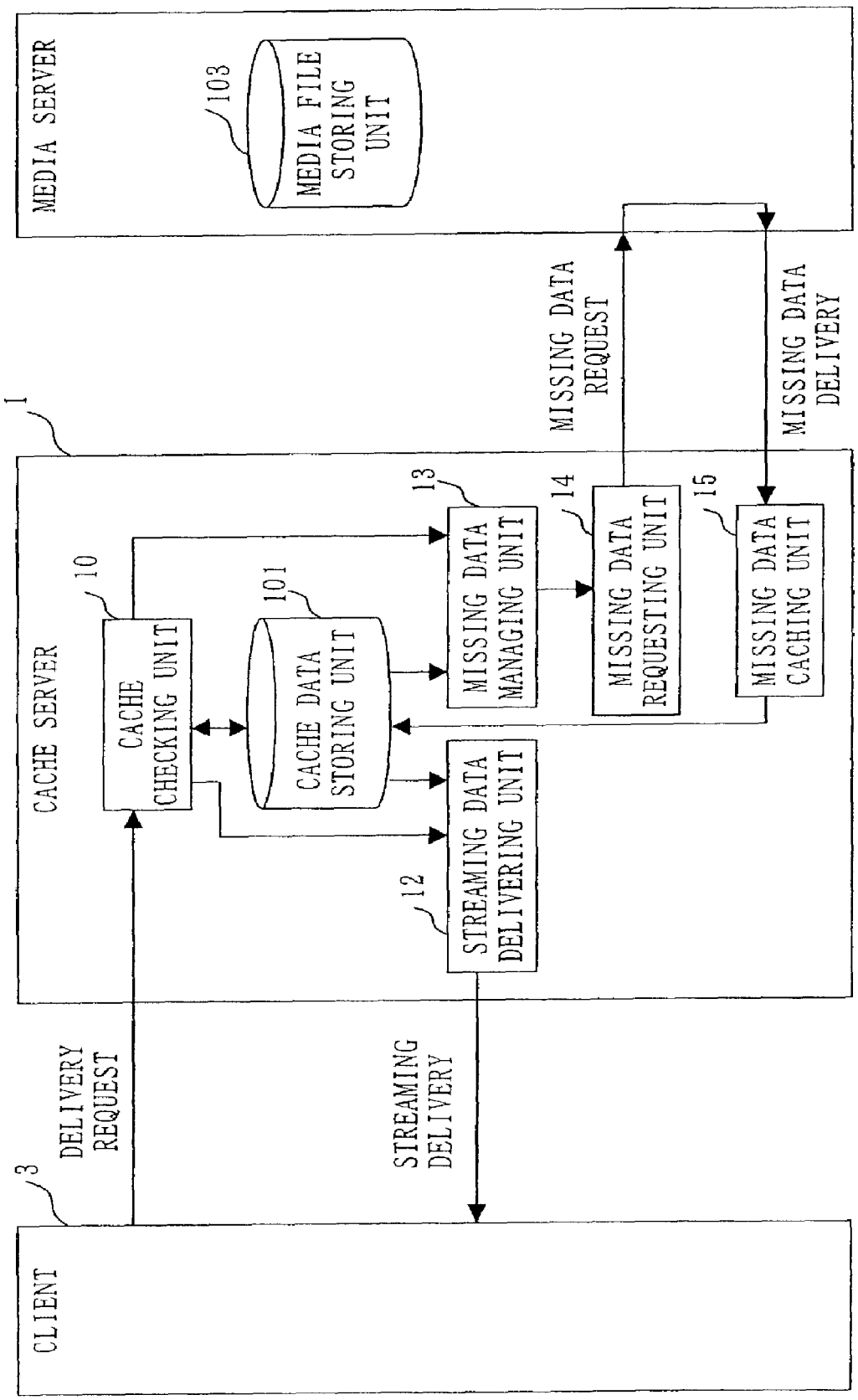
FIG. 5 shows a processing flow according to the fourth embodiment of the invention.

FIG. 5 shows an internal configuration of the cache server 1 according to the fourth embodiment.

In the figure, the cache server 1, the media server 2, the client 3, the cache checking unit 10, the streaming data delivering unit 12, the missing data managing unit 13, the cache data storing unit 101 are the same as ones shown in FIG. 2 according to the first embodiment.

Further, the missing data requesting unit 14 and the missing data caching unit 15 are the same as ones shown in FIG. 3 according to the second embodiment.

Here, in the present embodiment, the missing data managing unit 13 judges an existence of the missing data within the cache data stored in the cache data storing unit 101. Therefore, the missing data managing unit 13 functions as a missing data judging unit.

Further, in the fourth embodiment, it is a premise that the streaming data requested by the client 3 is stored in the cache data storing unit 101, and a part of the cache data is missing.

The cache data stored in the cache data storing unit 101 and requested by the client 3 is called stored requested information data.

In the following, an operation will be discussed.

First, the client 3 sends a delivery request for requesting the streaming data to the media server 2.

The cache server receives the delivery request, and the cache checking unit 10 checks if the streaming data requested by the client is stored in the cache data storing unit 101.

Since it is a premise that the streaming data requested by the client 3 is stored in the cache data storing unit 101, the cache checking unit 10 transfers the delivery request to the streaming data delivering unit 12 to make the streaming data delivering unit 12 perform the streaming delivery using the cache data.

In parallel with the above operation, the cache checking unit 10 transfers the process to the missing data managing unit 13. Since it is also a premise that the missing data exists within the cache data, the missing data managing unit 13 detects the missing data within the cache data which is requested to deliver by the client, and the missing data managing unit sends the information of the missing data to the missing data requesting unit 14.

The missing data requesting unit 14 sends the delivery request for the missing data to the media server based on the transferred missing data information to make the media server deliver the missing data.

The missing data caching unit 15 receives the missing data delivered from the media server, composes the missing data with the cache data, in which a part of the data is missing, stored in the cache data storing unit 101, and consequently the cache data compensated with the missing data is obtained.

The streaming data delivering unit 12 which has already performed the streaming delivery to the client can continue to perform the streaming delivery to the client using the cache data without caring about the missing data, since the missing data can be compensated beforehand as described above.

As discussed above, even if a part of the data stored in the cache is missing, the missing data can be obtained from the media server at the time of streaming delivery to the client, so that the cache data can be generated by compensating the missing data. As a result, it is possible for the streaming delivering unit to perform the streaming delivery to the client using the cache data compensated with the missing data.

Further, according to the fourth embodiment, the streaming data (information data) requested by the client (terminal device) is stored in the cache server (data communication apparatus), and even if a part of the requested streaming data stored is missing, the cache server (data communication apparatus) can previously obtain the missing data from the media server (delivering apparatus) before delivering to the client (terminal device) and performs the streaming delivery of the requested streaming data stored to the terminal device, which brings an advantage that the client (terminal device) can normally receive the streaming data without recognizing an existence of missing data.

Embodiment 5.

Figure 6:
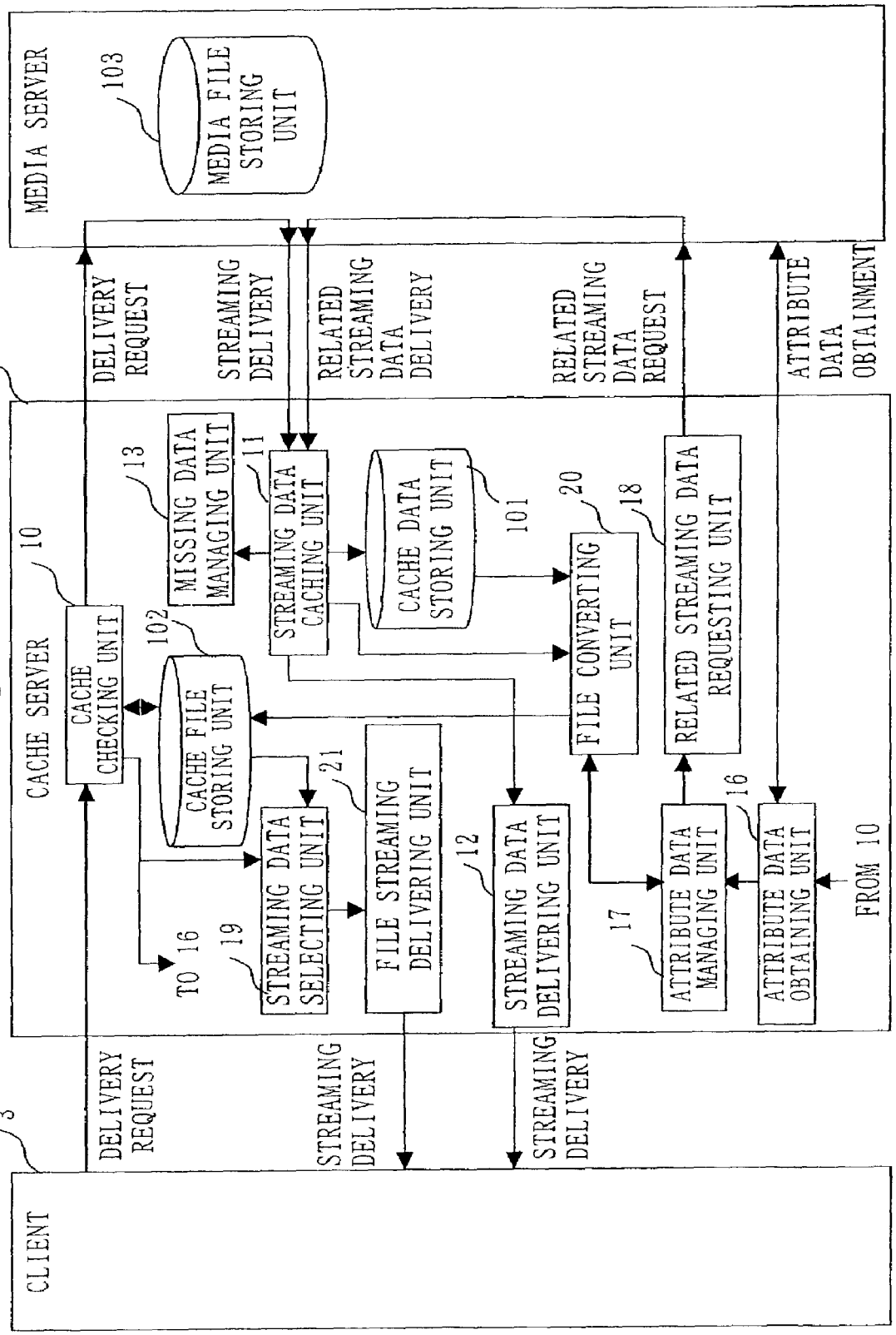
FIG. 6 shows a processing flow according to the fifth embodiment of the invention.

FIG. 6 shows an internal configuration of the cache server 1 according to the fifth embodiment.

In the figure, the cache server 1, the media server 2, the client 3, the cache checking unit 10, the streaming data caching unit 11, the streaming data delivering unit 12, the missing data managing unit 13, the cache data storing unit 101, and the media file storing unit 103 are the same as ones in the first embodiment.

Further, the missing data requesting unit 14 and the missing data caching unit 15 can be added to the configuration shown in FIG. 6, which enables the operation described in the first through fourth embodiments.

In the figure, a reference numeral 16 shows an attribute data obtaining unit, which sends a request for attribute data transmission (attribute information transmission request) to the media server 2 and receives the attribute data (attribute information) of the streaming data requested by the client from the media server 2. The received attribute data is sent to the attribute data managing unit 17.

Here, the attribute data shows an attribute of the streaming data itself and relation information with related streaming data and other accompanied data.

The attitude of the streaming data is, for example, a transmission rate.

The related streaming data is streaming data which has a close relation to the streaming data requested by the client. For example, data having different quality, video data having different view point, static image data accompanied to the video data, text, etc. belonging to the same media file (requested information data file).

The accompanied data is such as control information for the streaming data requested by the client, control information for the related streaming data.

Further, relation information with the related streaming data and other accompanied data are, for example, information showing if the streaming data requested by the client has any related streaming data and if the streaming data or the related streaming data has accompanied data.

In the following, the related streaming data and the accompanied data are gathered and called as related streaming data.

Further, the attribute data also shows data format of the media file including a specific streaming data.

The attribute data obtaining unit 16 corresponds to an attribute information transmission requesting unit and an attribute information receiving unit.

In the figure, a reference numeral 17 shows an attribute data managing unit, which stores the attribute data received by the attribute data obtaining unit 16 in the memory of the cache server and at the same time sends the attribute data to a related streaming data requesting unit 18.

Further, the attribute data managing unit 17 sends the attribute data to a file converting unit 20.

In the figure, a reference numeral 18 shows a related streaming data requesting unit, which requests the streaming delivery of the related streaming data from the media server 2 based on the attribute data received by the attribute data obtaining unit 16.

The related streaming data corresponds to related data.

Further, the related streaming data requesting unit corresponds to a related data delivery requesting unit.

In the figure, a reference numeral 19 shows a streaming data selecting unit, which receives the delivery request from the client 3 and selects the streaming data suitable for the request of the client 3 from the cache file including the related streaming data stored in the cache file storing unit 102 or the cache data stored in the cache data storing unit 101.

Further, the streaming data selecting unit 19 sends the selected streaming data to the streaming data delivering unit 12 or the file streaming delivering unit 21.

In the figure, a reference numeral 20 shows a file converting unit, which converts the cache data (including the related streaming data and the accompanied data) stored in the cache data storing unit 101 into a file of the same data format as the media file stored in the media file storing unit 103 of the media server 2 based on the data format shown by the attribute data obtained from the attribute data managing unit 17.

The cache data which has been converted into a file is stored in the cache file storing unit 102 as a cache file.

Here, the file converting unit 20 corresponds to a data converting unit.

Further, the file of the same data format as the media file in the media server 2 which has been converted by the file converting unit 20 corresponds a corresponding information data file.

In the figure, a reference numeral 21 shows a file streaming delivering unit, which performs the streaming delivery to the client using the cache file stored in the cache file storing unit 102. Or the streaming delivery can be performed using the streaming data selected by the streaming data selecting unit 19.

102 shows the cache file storing unit, which stores the cache file of which the data format has been converted by the file converting unit 20. The cache files are files of the streaming data and the related streaming data delivered from the media server 2 described above, of which the data format has been converted so as to have the same data format as the media file stored in the media server 2.

Here, the cache data storing unit 101 and the cache file storing unit 102 are gathered and called a data storing unit.

Next, an operation will be explained.

First, the client 3 sends the delivery request for requesting the streaming data to the media server 2.

When the cache server 1 receives the delivery request, the cache checking unit 10 checks if the media file including the streaming data requested by the client is stored in the cache file storing unit 102 as the cache file.

When the streaming data requested by the client is stored in the cache file storing unit 102, the streaming data selecting unit 19 selects the streaming data requested by the client 3 from the cache file and sends information of the selected streaming data to the file streaming data delivering unit 21.

The file streaming data delivering unit 21 performs the streaming delivery of the streaming data selected by the streaming data selecting unit 19 to the client using the cache file.

When the streaming data requested by the client is not stored in the cache file storing unit 102, the cache checking unit 10 sends the delivery request to the media server 2. Further, the cache checking unit 10 also sends the delivery request to the streaming data selecting unit 19 and the attribute data obtaining unit 16.

On receiving the delivery request, the media server 2 performs the streaming delivery of the requested streaming data to the client.

In the cache server 1, the streaming data caching unit 11 receives the streaming data delivered from the media server 2, and stores the delivered streaming data in the cache data storing unit 101 as the cache data.

At this time, the streaming data caching unit 11 sends the streaming data delivered from the media server directly to the streaming data delivering unit 12 and makes the streaming data delivering unit 12 perform the streaming delivery to the client 3.

When the streaming delivery from the media server 2 has been completed and the storage of the streaming data in the cache data storing unit 101 has been finished, the streaming data caching unit 11 notifies of the storage completion notice to the file converting unit 20.

The attribute data obtaining unit 16 sends the attribute data transmission request to the media server 2 based on the delivery request sent from the cache checking unit 10, and the attribute data of the streaming data requested by the client is obtained from the media server 2.

The obtained attribute data is sent to the attribute data managing unit 17.

The attribute data managing unit 17 stores the received attribute data in the memory device.

Further, the attribute data managing unit 17 sends the stored attribute data to the related streaming data requesting unit 18. And the attribute data managing unit 17 also outputs the stored attribute data in response to the request from the file converting unit 20.

The related streaming data requesting unit 18 receives the attribute data from the attribute data managing unit 17 and checks an existence and a type of the related streaming data of the streaming data requested by the client based on the attribute data.

When the related streaming data exists, the delivery request for the related streaming data is sent to the media server 2. If plural pieces of the related streaming data exist, the delivery request for all pieces of the related streaming data is issued.

The related streaming data delivered from the media server 2 is received by the streaming data caching unit 11 and stored in the cache data storing unit 101 as the cache data. When the streaming delivery of the related streaming data from the media server 2 has been completed and the storage of the related streaming data in the cache data storing unit 101 has been finished, the streaming data caching unit 11 sends the storage completion notice to the file converting unit 20.

The file converting unit 20 receives the storage completion notices of the streaming data and the related streaming data from the streaming data caching unit 11 and obtains the corresponding attribute data by asking the attribute data managing unit 17.

The file converting unit 20 obtains the streaming data and the related streaming data stored in the cache data storing unit 101 based on the attribute data, performs data conversion of the streaming data and the related streaming data, and generates the same cache file as the media file stored in the media server 2. Further, the generated cache file is stored in the cache file storing unit 102, and the file is to be used for caching. After the cache file is stored, the cache data is deleted.

At the stage of storing the cache file in the cache file storing unit 102, if another client sends the delivery request for the streaming data included in the same cache file, the cache checking unit 10 transfers the delivery request to the streaming data selecting unit 19. The streaming data selecting unit 19 selects the streaming data requested by the client from the cache file and sends information of the selected streaming data to the file streaming delivering unit 21.

The file streaming delivering unit 21 performs the streaming delivery of the streaming data selected by the streaming data selecting unit 19 to the client using the cache file.

As discussed above, even if the media file stores plural pieces of the related streaming data, the cache server obtains the plural pieces of the related streaming data, generates the cache file having the same contents as the media file, and stores the generated cache file in the cache. Further, even if the client sends the delivery request for the related streaming data, the cache server can perform the same streaming delivery as the media server, since the cache server stores the cache file having the same contents as the media file.

Further, according to the fifth embodiment, the cache server (data communication apparatus) converts a data format of the streaming data (information data) so as to have the same data format as the corresponding media file stored in the media server (delivering apparatus) and stores the media file, which brings an advantage that the cache server (data communication apparatus) can perform the same service as the one performed by the media server (delivering apparatus).

Further, the cache server (data communication apparatus) can obtain the same streaming delivery function as the media server (delivering apparatus), so that it is possible to greatly reduce the cost for developing the cache server (data communication apparatus).

Embodiment 6.

Figure 7:
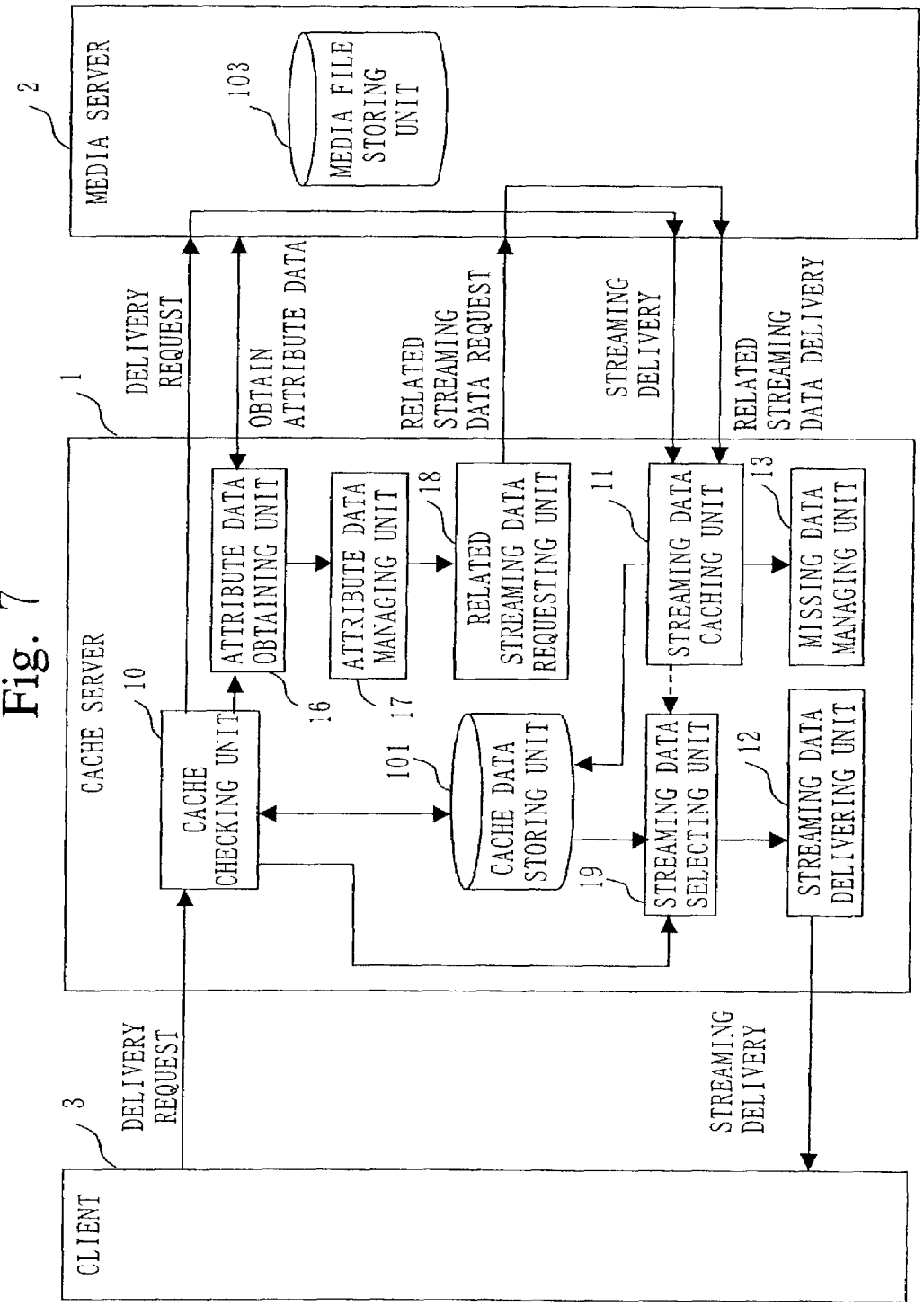
FIG. 7 shows a processing flow according to the sixth embodiment of the invention.

FIG. 7 shows an internal configuration of the cache server 1 according to the sixth embodiment.

In the figure, the cache server 1, the media server 2, the client 3, the cache checking unit 10, the streaming data caching unit 11, the streaming data delivering unit 12, the missing data managing unit 13, the attribute data obtaining unit 16, the attribute data managing unit 17, the related streaming data requesting unit 18, the streaming data selecting unit 19, the cache data storing unit 101, and the media file storing unit 103 are the same as ones used in the first through fifth embodiments.

Further, the missing data requesting unit 14 and the missing data caching unit 15 can be added to the configuration shown in FIG. 7, which enables the operations of the first through fourth embodiments.

Further, it is assumed some media files delivered from the media server include plural pieces of the related streaming data as well as the streaming data.

Next, an operation will be explained.

First, the client 3 sends the delivery request for the streaming data to the media server 2.

In the cache server 1, the cache checking unit 10 receives the delivery request and checks if the streaming data requested by the client is stored in the cache data storing unit 101 as the cache data. If the cache data storing unit 101 stores the requested streaming data, the streaming data selecting unit 19 selects the streaming data requested by the client from the cache data and sends information of the selected streaming data to the streaming data delivering unit 12.

The streaming data delivering unit 12 performs the streaming delivery of the streaming data selected by the streaming data selecting unit to the client using the cache data.

If the cache data storing unit 101 does not store the requested streaming data, the delivery request is sent to the media server 2, and the delivery request is also sent to the streaming data selecting unit 19 and the attribute data obtaining unit 16 at the same time.

The attribute data obtaining unit 16 obtains the attribute data of the streaming data requested by the client from the media server 2 based on the delivery request sent from the cache checking unit 10.

The obtained attribute data is sent to the attribute data managing unit 17.

The attribute data managing unit 17 stores the received attribute data in the memory device. Further, the attribute data managing unit 17 sends the stored attribute data to the related streaming data requesting unit 18.

After receiving the attribute data from the attribute data managing unit 17, the related streaming data requesting unit 18 checks an existence and a type of the related streaming data of the streaming data requested by the client 3 based on the attribute data. If there exists the related streaming data, the delivery request for the related streaming data is sent to the media server 2. If there are plural pieces of the related streaming data, the delivery request for all of the plural pieces of the streaming data is issued.

The media server 2 performs the streaming delivery of the streaming data requested by the client 3, and at the same time, the media server 2 performs the streaming delivery of the related streaming data requested by the cache server 1.

In the cache server 1, the streaming data caching unit 11 receives the delivered streaming data and the related streaming data, and stores the delivered streaming data and the related streaming data in the cache data storing unit 101.

Further, the streaming data selecting unit 19 receives the delivery request sent by the client from the cache checking unit 10, selects the streaming data requested by the client from the streaming data and the related streaming data stored in the cache data storing unit 101, and sends the selected streaming data to the streaming data delivering unit 12.

The streaming data delivering unit 12 performs the streaming delivery of the received streaming data to the client. In another way, the streaming data caching unit 11 can send the streaming data delivered from the media server 2 directly to the streaming data selecting unit 19, the streaming data selecting unit 19 select the streaming data requested by the client, and the streaming data delivering unit 12 can perform the selected streaming deliver to the client.

As described above, even if some media files include plural pieces of the related streaming data as well as the streaming data, the cache server can obtain the streaming data and the plural pieces of the related streaming data at the same time in response to the delivery request from the client and stores in the cache. Further, when the client sends the delivery request for the related streaming data, the cache server can perform the same streaming delivery as the media server, since the cache server stores the cache file of the same content as the media file.

Further, according to the sixth embodiment, as for the media file (information data file) including plural pieces of streaming data, the cache server (data communication apparatus) can make the media server (delivering apparatus) perform the streaming delivery of all of the streaming data in the media file in connection with the delivery request from the client (terminal device), and the cache server (data communication apparatus) can store all of the streaming data. Accordingly, when another client (terminal device) requests another piece of streaming data included in the same media file, a hit ratio can be increased because another piece of streaming data is already stored.

Embodiment 7.

Figure 8:
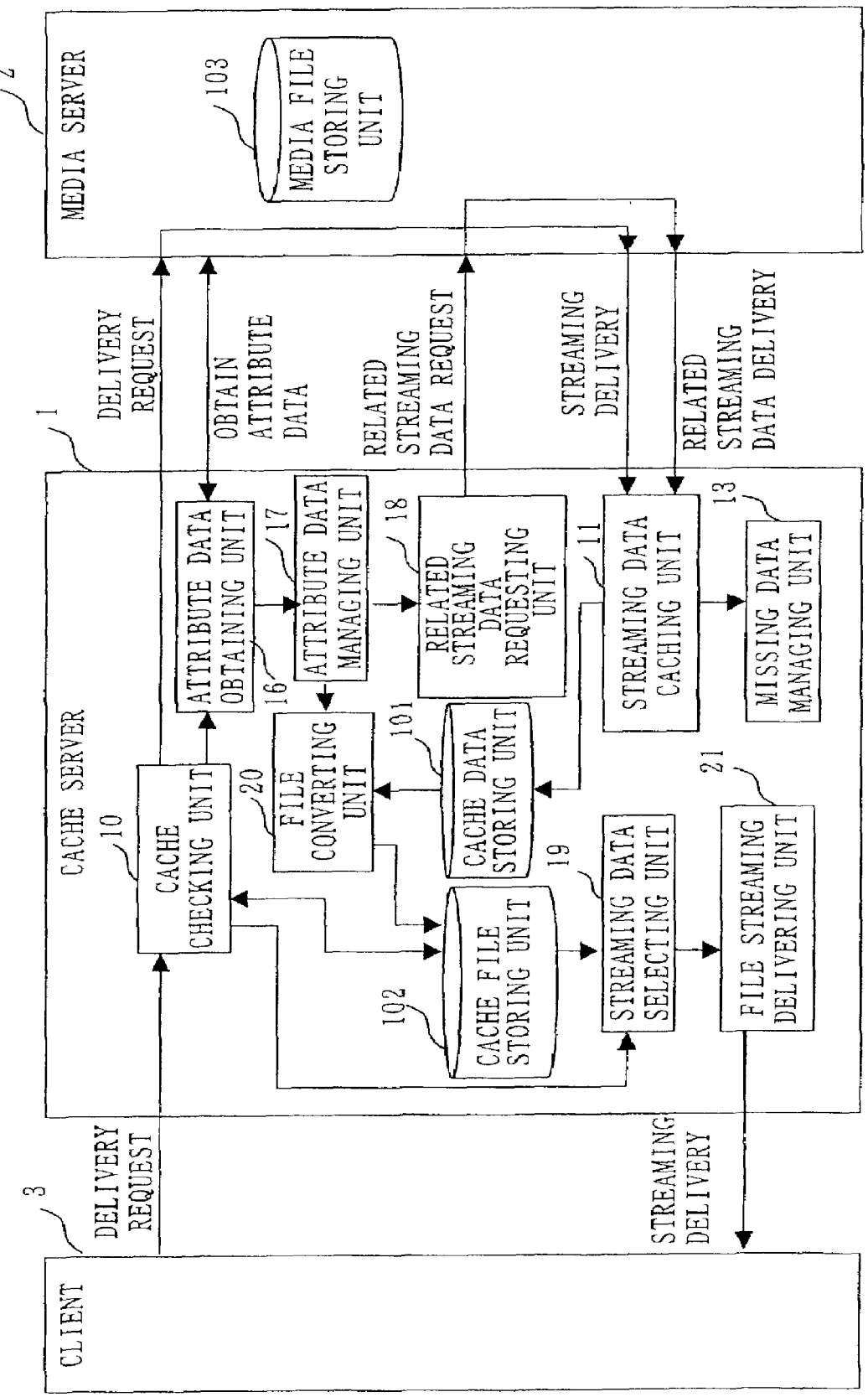
FIG. 8 shows a processing flow according to the seventh embodiment of the invention.

FIG. 8 shows an internal configuration of the cache server 1 according to the seventh embodiment.

In the figure, the cache server 1, the media server 2, the client 3, the cache checking unit 10, the streaming data caching unit 11, the streaming data delivering unit 12, the missing data managing unit 13, the attribute data obtaining unit 16, the attribute data managing unit 17, the related streaming data requesting unit 18, the streaming data selecting unit 19, the file converting unit 20, a file streaming delivering unit 21, the cache data storing unit 101, the cache file storing unit 102, and the media file storing unit 103 are the same as ones of the first through fourth embodiment.

Further, the missing data requesting unit 14 and the missing data caching unit 15 can be added to the configuration shown in FIG. 8, which enables the operation described in the first through fourth embodiments.

Further, it is assumed that some media files delivered from the media server include plural pieces of the related streaming data as well as the streaming data.

Next, an operation will be explained.

First, the client 3 sends the delivery request for the streaming data to the media server 2.

In the cache server 1, the cache checking unit 10 receives the delivery request, and checks if the media file including the streaming data requested by the client 3 is stored as a cache file in the cache file storing unit 102.

When the media file is stored as the cache file in the cache file storing unit 102, the streaming data selecting unit 19 selects the streaming data requested by the client 3 from the cache file and sends information of the streaming data to the file streaming delivering unit 21. The file streaming delivering unit 21 performs the streaming delivery of the streaming data selected by the streaming data selecting unit 19 to the client using the cache file.

If the media file is not stored in the cache file storing unit 102, the delivery request is sent to the media server 2, and at the same time, the delivery request is also sent to the streaming data selecting unit 19 and the attribute data obtaining unit 16.

The attribute data obtaining unit 16 obtains the attribute data of the streaming data requested by the client from the media server based on the delivery request sent from the cache checking unit 10.

The obtained attribute data is sent to the attribute data managing unit 17.

The attribute data managing unit 17 stores the received attribute data in the memory device. Further, the attribute data managing unit 17 sends the stored attribute data to the related streaming data requesting unit 18.

The related streaming data requesting unit 18 receives the attribute data from the attribute data managing unit 17 and checks an existence and a type of the related streaming data of the streaming data requested by the client. When the related streaming data exists, the delivery request for the related streaming data is issued to the media server. If there are plural pieces of the related streaming data, the delivery request for all of the plural pieces of the related streaming data is issued.

The media server 2 performs the streaming delivery of the streaming data requested by the client 3, and at the same time, the media server 2 performs the streaming delivery of the related streaming data requested by the cache server.

In the cache server 1, the streaming data caching unit 11 receives the delivered streaming data and the related streaming data, and stores the delivered streaming data and the related streaming data in the cache data storing unit 101.

When the streaming delivery from the media server has been completed and the storage of the delivered streaming data and the related streaming data in the cache data storing unit 101 has been finished, the streaming data caching unit 11 sends the storage completion notice to the file converting unit 20.

After informed of the storage completion notice of the delivered streaming data and the related streaming data in the cache data storing unit 101, the file converting unit 20 obtains the corresponding attribute data by asking the attribute data managing unit 17. The file converting unit 20 obtains the streaming data and the related streaming data stored in the cache data storing unit 101 based on the attribute data, and generates the cache file having the same contents as the media file stored in the media server 2. Further, the generated cache file is stored in the cache file storing unit 102, and the stored cache file is to be used for caching. After the generated cache file is stored in the cache file storing unit 102, the cache data is deleted from the cache data storing unit 101.

At the stage of the cache file being stored in the cache file storing unit 102, the streaming data selecting unit 19 selects the streaming data requested by the client from the cache file and sends the selected streaming data to the file streaming delivering unit 21. The file streaming delivering unit 21 performs the streaming delivery of the streaming data selected by the streaming data selecting unit 19 using the cache file.

As discussed above, even if the media file includes plural pieces of the related streaming data as well as the streaming data, the cache server can obtain the streaming data and the plural pieces of the related streaming data, generate the cache file of the same contents as the media file, and store the streaming data and the plural pieces of the related streaming data in the cache. Further, when if the client requests for the delivery of the related streaming data, the cache server can perform the same streaming delivery as the media server, since the cache server stores the cache file having the same content as the media file.

Further, according to the seventh embodiment, as for the media file (information data file) including plural pieces of streaming data, the cache server (data communication apparatus) can make the media server (delivering apparatus) perform the streaming delivery of all of the streaming data in the media file in connection with the delivery request from the client (terminal device), converts a data format of the streaming data to have the same data format as the media file stored in the media server (delivering apparatus), and stores the corresponding media file. Therefore, the same service as one performed by the media server (delivering apparatus) can be performed instantly based on the request from only one client (terminal device).

Further, the cache server (data communication apparatus) can obtain the same streaming delivery function as the media server (delivering apparatus), so that it is possible to greatly reduce the cost for developing the cache server (data communication apparatus).

Embodiment 8.

Figure 9:
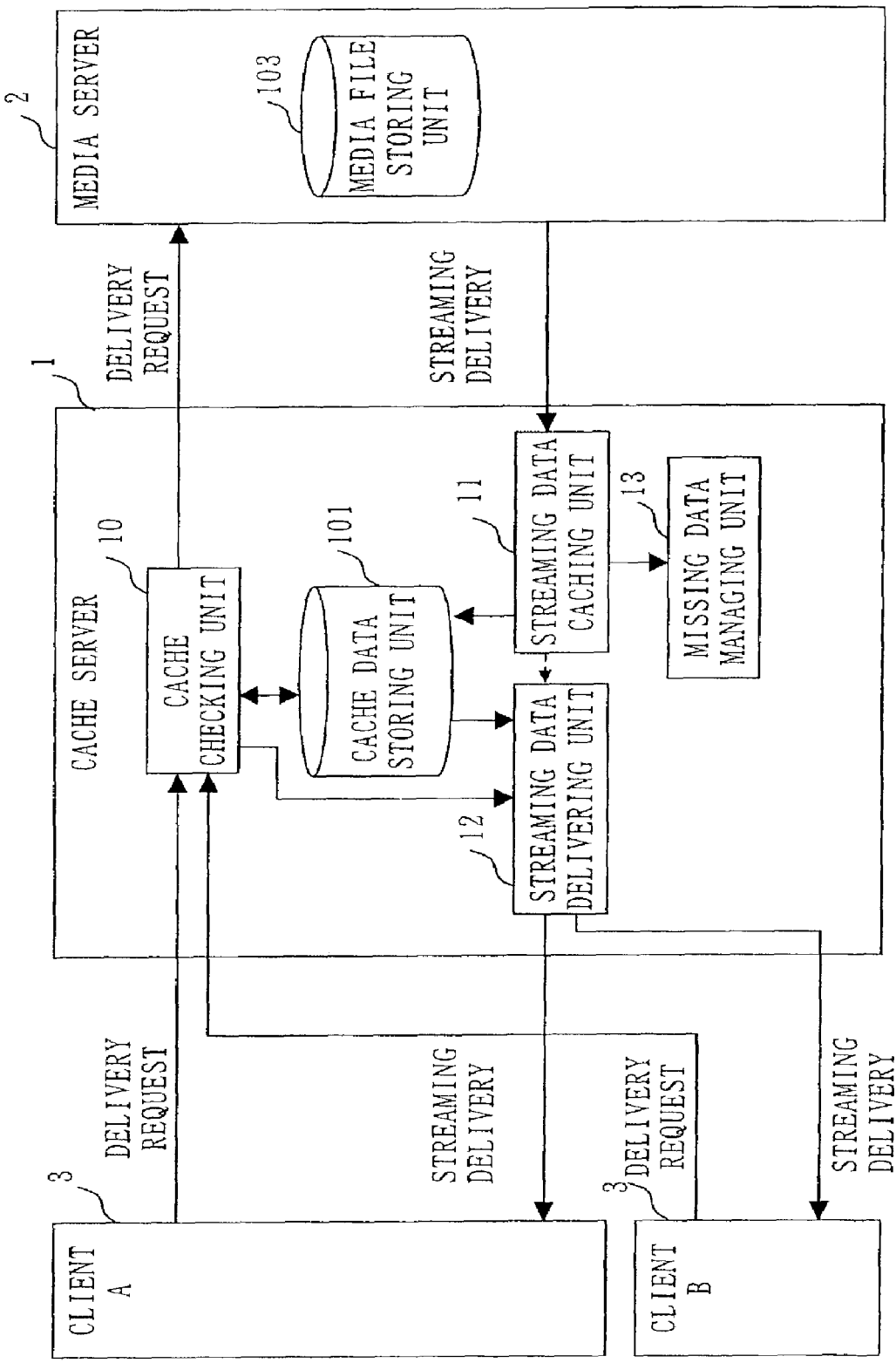
FIG. 9 shows a processing flow according to the eighth embodiment of the invention.

FIG. 9 shows an internal configuration of the cache server 1 according to the eighth embodiment.

In the figure, the cache server 1, the media server 2, the client 3, the cache checking unit 10, the streaming data caching unit 11, the streaming data delivering unit 12, the missing data managing unit 13, the cache data storing unit 101, and the media file storing unit 103 are the same as ones in the first through seventh embodiments.

The missing data requesting unit 14, the missing data caching unit 15, the attribute data obtaining unit 16, the attribute data managing unit 17, the related streaming data requesting unit 18, the file converting unit 20, the streaming data selecting unit 19, and the file streaming delivering unit 21 can be added to the configuration of FIG. 9, which enables the operation described in the first through seventh embodiments.

A series of processing from the step of receiving the delivery request from the client to the steps of checking if the streaming data requested by the client is stored in the cache data storing unit 101, sending the delivery request to the media server, storing the streaming data in the cache data storing unit 101, and performing the streaming delivery to the client are the same as ones as described in the first embodiment.

In the eighth embodiment, another case will be described, in which at the cache server 1, the streaming data caching unit 11 stores the streaming data delivered from the media server 2, and the streaming data delivering unit 12 performs the streaming delivery to the client.

In this case, when another client requests for the delivery of the streaming data being stored in the cache data storing unit 101, the cache checking unit 10 judges that the requested streaming data has been stored in the cache data storing unit 101 even if the requested streaming data is being stored, and the cache checking unit 10 sends the delivery request from another client to the streaming data delivering unit 12. The streaming data delivering unit 12 obtains the corresponding streaming data from the cache data storing unit 101 according to the delivery request from another client and performs the streaming delivery to that client.

However, there is a possibility that the storage of the streaming data in the cache data storing unit 101 may be suspended because the prior client stops the reproduction.

At this time, a part of the streaming data up to the position where the prior client stops the reproduction is stored in the cache data storing unit 101.

The streaming data delivering unit 12 performs the streaming delivery to another client who later reproduces the same streaming data using the cache data up to the position where the prior client stops the reproduction. The streaming data delivering unit 12 informs the cache checking unit 10 that there is no cache data stored as for the part of the streaming data after the position where the prior client stops the reproduction.

When the cache checking unit 10 is informed of nonexistence of the cache data, the cache checking unit 10 requests for the delivery of a part of the streaming data after the position where the prior client stops the reproduction.

The streaming data delivering unit 12 can inform the cache checking unit 10 of nonexistence of the cache data previously, for example, at the time when the prior client stops the reproduction, instead of the timing after the part of the streaming data has been delivered.

On receiving the delivery request from the cache server 1, the media server 2 performs the streaming delivery of the streaming data from the position where the delivery is requested from the cache server 1.

The cache server 1 receives the streaming data delivered from the media server 2 and stores the delivered streaming data in the cache data storing unit 101 so as to add to the cache data previously stored by the streaming data caching unit 11.

Simultaneously, the streaming data delivering unit 12 performs the streaming delivery to the client using the stored streaming data. At this time, the streaming data caching unit 11 can send the streaming data delivered from the media server 2 directly to the streaming data delivering unit 12, and the streaming data delivering unit 12 can perform the streaming delivery to another client.

As described above, even if the cache server is receiving, storing, performing the streaming delivery of the streaming data from the media server, and when another delivery request is received for the streaming data being stored in the cache from another client, the streaming delivery can be performed to another client using the data stored in the cache. Therefore, a hit ratio of the cache can be increased.

Further, according to the eighth embodiment, the cache server (data communication apparatus) can perform the streaming delivery of the streaming data (information data) in response to a request from another client (terminal device) using the streaming data being stored even if the cache server (data communication apparatus) is storing the streaming data delivered from the media server (delivering apparatus), which brings an advantage to increase a hit ratio of the streaming data.

In the foregoing first through eighth embodiments, the explanation has been done in connection with the data communication apparatus according to the present invention, and a data communication method can be implemented according to the present invention with operations described in the first through eight embodiments.

Hereinafter, the characteristics of the cache server apparatus and the caching method described in the first through eighth embodiments will be rementioned below.

According to the cache server apparatus and the caching method described in the first embodiment, the cache server is located between the client who reproduces the streaming data and the media server which performs the streaming delivery of the streaming data. The cache server checks if the streaming data requested by the client is stored in the cache or not, and if the streaming data is stored in the cache, the streaming data is delivered to the client from the cache server. If the streaming data is not stored in the cache, at least the delivery request from the client is sent to the media server, and the streaming data delivered from the media server is cached. The cache server includes a unit for storing the position of missing data and a unit for notifying the client of the missing data, when a part of the streaming data delivered from the media server is missing.

According to the cache server apparatus and the caching method described in the second embodiment, the cache server is located between the client who reproduces the streaming data and the media server which performs the streaming delivery of the streaming data. The cache server judges if the streaming data requested by the client is stored in the cache or not, and if the streaming data is stored in the cache, the streaming data is delivered to the client from the cache server. If the streaming data is not stored in the cache, at least the delivery request from the client is sent to the media server, and the streaming data delivered from the media server is cached. The cache server includes a unit for immediately requesting the missing data from the media server and a unit for storing the missing data in the cache, when a part of the streaming data delivered from the media server is missing.

According to the cache server apparatus and the caching method described in the third embodiment, the cache server is located between the client who reproduces the streaming data and the media server which performs the streaming delivery of the streaming data. The cache server judges if the streaming data requested by the client is stored in the cache or not, and if the streaming data is stored in the cache, the streaming data is delivered to the client from the cache server. If the streaming data is not stored in the cache, at least the delivery request from the client is sent to the media server, and the streaming data delivered from the media server is cached. The cache server includes a unit for requesting the missing data from the media server independently from delivering the missing data to the client and a unit for storing the missing data in the cache, when a part of the streaming data delivered from the media server is missing.

According to the cache server apparatus and the caching method described in the fourth embodiment, the cache server includes a unit for previously detecting the missing data within the streaming data stored in the cache, a unit for requesting the missing data from the media server, and a unit for storing the missing data in the cache, when the cache server performs the streaming delivery from the cache server in response to the client's request.

According to the cache server apparatus and the caching method described in the fifth embodiment, the cache server includes a unit for obtaining the attribute data of the streaming data from the media server, a unit for storing the attribute data, a unit for requesting the related streaming data from the media server based on the attribute data, a unit for generating a file having the same content as the media file based on the stored attribute data and the streaming data stored in the cache, and storing the generated file in the cache as a cache file, and a unit for performing the streaming delivery of the streaming data requested by the client using the cache file stored in the cache.

According to the cache server apparatus and the caching method described in the sixth embodiment, the cache server includes a unit for obtaining the attribute data of the streaming data from the media server, a unit for storing the attribute data, a unit for requesting plural pieces of the related streaming data including the streaming data requested by the client from the media server simultaneously with receiving the client's request, a unit for selecting the streaming data to be delivered to the client out of the related streaming data, and a unit for performing the streaming delivery of the selected streaming data to the client.

According to the cache server apparatus and the caching method described in the seventh embodiment, the cache server includes a unit for generating a file having the same content as the media file based on the stored attribute data and the streaming data stored in the cache and storing the generated file in the cache as a cache file, and a unit for performing the streaming delivery of the streaming data requested by the client using the cache file stored in the cache.

According to the cache server apparatus and the caching method described in the eighth embodiment, the cache server includes a unit for performing the streaming delivery of the streaming data to another client using the cache data when another client requests the same data which is being cached.

Having thus described several particular embodiments of the present invention, various alterations, modifications, and improvements will readily occur to those skilled in the art. Such alterations, modifications, and improvements are intended to be part of this disclosure, and are intended to be within the spirit and scope of the present invention. Accordingly, the foregoing description is by way of example only, and is not intended to be limiting. The present invention is limited only as defined in the following claims and the equivalents thereto.

What is claimed is:

1. A data communication apparatus performing communication between a terminal device requesting streaming delivery of a piece of information and a delivering apparatus holding at least one piece of information data and performing the streaming delivery of the information data requested by the terminal device, the data communication apparatus comprising:

a data storing unit available to store any piece of the information data;

a delivery request receiving unit for receiving a delivery request of the streaming delivery of specific information data from the terminal device;

a data checking unit for checking if requested information data of which the streaming delivery is requested by the delivery request is stored in the data storing unit, and sending the delivery request to the delivering apparatus if the requested information data is not stored in the data storing unit;

a data receiving unit for receiving delivered requested information data which is the requested information data delivered from the delivering apparatus, and judging an existence of missing data within the delivered requested information data;

a data delivering unit for performing the streaming delivery of the delivered requested information data received by the data receiving unit to the terminal device;

a missing data transmission requesting unit for sending a missing data transmission request to the delivering apparatus for requesting a transmission of the missing data within the delivered requested information data, when the missing data is detected within the delivered requested information data by the data receiving unit; and a missing data receiving unit for receiving the missing data from the delivering apparatus, and wherein the data storing unit stores the delivered requested information data received by the data receiving unit, and stores the missing data received by the missing data receiving unit with relating the missing data to the delivered requested information data;

wherein before the data storing unit finishes storing the delivered requested information data, the delivery request receiving unit receives the delivery request of the delivered requested information data from a new terminal device other than the terminal device, and then the data storing unit finishes storing the delivered requested information data without storing a part of the delivered requested information data, the data delivering unit performs the streaming delivery of the delivered requested information data except an unstored part which has not been stored in the data storing unit to the new terminal device, the data checking unit sends an unstored part delivery request for requesting the streaming delivery of the unstored part to the delivering apparatus, the data receiving unit receives the unstored part delivered from the delivering apparatus, and the data delivering unit performs the streaming delivery of the unstored part received by the data receiving unit to the new terminal device.

2. The data communication apparatus of claim 1, wherein the data receiving unit receives the delivered requested information data with judging an existence of the missing data, and wherein the missing data transmission requesting unit sends the missing data transmission request to the delivering apparatus at a time when the data receiving unit detects the missing data within the delivered requested information data.

3. The data communication apparatus of claim 1, wherein the data receiving unit receives the delivered requested information data with judging an existence of the missing data, stores the delivered requested information data in the data storing unit in an order of receiving the delivered requested information data, and suspends a process of storing the delivery requested data in the data storing unit at a time when the missing data is detected within the delivered requested information data, and restarts the process of storing the delivery requested data in the data storing unit after the missing data has been stored in the data storing unit.

4. The data communication apparatus of claim 1, wherein when the missing data is detected by the data receiving unit, the missing data transmission requesting unit sends the missing data transmission request to the delivering apparatus after the data storing unit has stored the delivered requested information data.

5. The data communication apparatus of claim 1, wherein, when the delivered requested information data is stored in the data storing unit, the data delivering unit performs the streaming delivery of the delivered requested information data stored in the data storing unit to the terminal device.

6. A data communication apparatus for performing communication between a terminal device requesting streaming delivery of a piece of information data and a delivering apparatus holding at least one information data file which includes at least one piece of information data and performing the streaming delivery of the information data requested by the terminal device, the data communication apparatus comprising:

a data storing unit available to store any of the information data file;

a delivery request receiving unit for receiving a delivery request of the streaming delivery of specific information data from the terminal device;

a data checking unit for checking if an information data file including requested information data of which the streaming delivery is requested by the delivery request is stored in the data storing unit, and sending the delivery request to the delivering unit if the information data file including the requested information data is not stored in the data storing unit;

a related data delivery requesting unit for judging if requested information data file which includes the requested information data includes other data than the requested information data at the delivering apparatus when the information data file including the requested information data is not stored in the data storing unit, and sending a related data delivery request to the delivering apparatus for requesting the streaming delivery of other data as related data relating to the requested information data when the requested information data file includes other data;

a data receiving unit for receiving the requested information data delivered from the delivering apparatus in response to the delivery request, and receiving the related data delivered from the delivering apparatus in response to the related data delivery request;

a data delivering unit performing the streaming delivery of the requested information data received by the data receiving unit to the terminal device, and wherein the data storing unit stores the requested information data received by the data receiving unit, and stores the related data received by the data receiving unit with relating the related data to the requested information data;

wherein before the data storing unit finishes storing the delivered requested information data, the delivery request receiving unit receives the delivery request of the delivered requested information data from a new terminal device other than the terminal device, and then the data storing unit finishes storing the delivered requested information data without storing a part of the delivered requested information data, the data delivering unit performs the streaming delivery of the delivered requested information data except an unstored part which has not been stored in the data storing unit to the new terminal device, the data checking unit sends an unstored part delivery request for requesting the streaming delivery of the unstored part to the delivering apparatus, the data receiving unit receives the unstored part delivered from the delivering apparatus, and the data delivering unit performs the streaming delivery of the unstored part received by the data receiving unit to the new terminal device.

7. The data communication apparatus of claim 6, wherein, when the information data file includes other information data than the requested information data, the data receiving unit receives other information data delivered as the related data.

8. The data communication apparatus of claim 6, wherein, when the information data file includes appended data other than the requested information data, the data receiving unit receives the appended data delivered as the related data.

9. The data communication apparatus of claim 6, wherein the delivering apparatus holds attribute information showing data included in the information data file for each of the information data file held in the delivering apparatus, wherein the data communication apparatus further comprises:

an attribute information transmission requesting unit for sending an attribute information transmission request to the delivering apparatus for requesting the attribute information of the requested information data file; and an attribute information receiving unit for receiving the attribute information of the requested information data file from the delivering apparatus, and wherein the related data delivery requesting unit judges if the requested information data file includes other data than the requested information data based on the attribute information of the requested.

10. The data communication apparatus of claim 6, wherein, when the information data file including the requested information data is stored in the data storing unit, the data delivering unit performs the streaming delivery of the requested information data from the data storing unit to the terminal device.

11. A data communication apparatus for performing communication between a terminal device requesting streaming delivery of a piece of information data and a delivering apparatus holding at least one information data file which includes at least one piece of information data and performing the streaming delivery of the information data requested by the terminal device, the data communication apparatus comprising:

a data storing unit available to store any of the information data file;

a delivery request receiving unit for receiving a delivery request of the streaming delivery of specific information data from the terminal device;

a data checking unit for checking if an information data file including requested information data of which the streaming delivery is requested by the delivery request is stored in the data storing unit, and sending the delivery request to the delivering unit if the information data file including the requested information data is not stored in the data storing unit;

a related data delivery requesting unit for judging if requested information data file which includes the requested information data includes other data than the requested information data at the delivering apparatus when the information data file including the requested information data is not stored in the data storing unit, and sending a related data delivery request to the delivering apparatus for requesting the streaming delivery of other data as related data relating to the requested information data when the requested information data file includes other data;

a data receiving unit for receiving the requested information data delivered from the delivering apparatus in response to the delivery request, and receiving the related data delivered from the delivering apparatus in response to the related data delivery request;

a data delivering unit performing the streaming delivery of the requested information data received by the data receiving unit to the terminal device, and wherein the data storing unit stores the requested information data received by the data receiving unit, and stores the related data received by the data receiving unit with relating the related data to the requested information data;

wherein the delivering apparatus specifies a data format for each of the information data file and holds the information data file in the data format specified, wherein the data communication apparatus further comprises a data converting unit for converting the data format of the requested information data and the related data received by the data receiving unit and generating a corresponding information data file which is the information data file including the requested information data and the related data after converting the data format and having same data format as the requested information data file, and wherein the data storing unit stores the corresponding information data file generated by the data converting unit;

wherein before the data storing unit finishes storing the delivered requested information data, the delivery request receiving unit receives the delivery request of the delivered requested information data from a new terminal device other than the terminal device, and then the data storing unit finishes storing the delivered requested information data without storing a part of the delivered requested information data, the data delivering unit performs the streaming delivery of the delivered requested information data except an unstored part which has not been stored in the data storing unit to the new terminal device, the data checking unit sends an unstored part delivery request for the requesting the streaming delivery of the unstored part to the delivering apparatus, the data receiving unit receives the unstored part delivered from the delivering apparatus, and the data delivering delivering unit performs the streaming delivery of the unstored part received by the data receiving unit to the new terminal device.

12. The communication apparatus of claim 11, wherein the delivering apparatus holds attribute information showing the data format of each of the information data file held, wherein the data communication apparatus further comprises:

an attribute information transmission requesting unit for sending an attribute transmission request to the delivering apparatus for requesting transmission of the attribute information of the requested information data file; and an attribute information receiving unit for receiving the attribute information of the requested information data file from the delivering apparatus, and wherein the data converting unit converts the data format of the requested information data and the related data received by the data receiving unit based on the attribute information of the requested information data file received by the attribute information receiving unit.

13. The data communication apparatus of claim 12, wherein the data delivering unit performs the streaming delivery of the requested information data of which the data format has been converted included in the corresponding information data file stored in the data storing unit to the terminal device.

14. A data communication apparatus for performing communication between a terminal device requesting streaming delivery of a piece of information data and a delivering apparatus holding at least one piece of information data and performing the streaming delivery of the information data requested by the terminal device, the data communication apparatus comprising:

a data storing unit available to store any piece of the information data;

a delivery request receiving unit for receiving a delivery request of the streaming delivery of specific information data from the terminal device;

a data checking unit for checking if requested information data of which the streaming delivery is requested by the delivery request is stored in the data storing unit, and sending the delivery request to the delivering apparatus if the requested information data is not stored in the data storing unit;

a data receiving unit for receiving delivered requested information data which is the requested information data delivered from the delivering apparatus, and judging an existence of missing data within the delivered requested information data;

a data delivering unit for performing the streaming delivery of the delivered requested information data received by the data receiving unit to the terminal device; and a missing data notifying unit for sending a missing data notice for informing of the missing data within the delivered requested information data, when the missing data is detected within the delivered requested information data by the data receiving unit;

wherein the data storing unit stores the delivered requested information data received by the data receiving unit;

wherein before the data storing unit finishes storing the delivered requested information data, the delivery request receiving unit receives the delivery request of the delivered requested information data from a new terminal device other than the terminal device, and then the data storing unit finishes storing the delivered requested information data without storing a part of the delivered requested information data, the data delivered unit performs the streaming delivery of the delivered requested information data except an unstored part which has not been stored in the data storing unit to the new terminal device, the data checking unit sends an unstored part delivery request for requesting the streaming delivery of the unstored part to the delivering apparatus, the data receiving unit receives the unstored part delivered from the delivering apparatus, and the data delivering unit performs the streaming delivery of the unstored part received by the data receiving unit to the new terminal device.

* * * * *

UNITED STATES PATENT AND TRADEMARK OFFICE
CERTIFICATE OF CORRECTION

| | | |
|---|---|---|
| PATENT NO. | : 7,051,100 B2 | Page 1 of 1 |
| APPLICATION NO. | : 10/137428 | |
| DATED | : May 23, 2006 | |
| INVENTOR(S) | : Yasuhiro Suzuki et al. | |

It is certified that error appears in the above-identified patent and that said Letters Patent is hereby corrected as shown below:

<u>On the Title page of the patent</u> Insert Item [73]

At page 1, column 1 Line 5 "Mitsububishi" should read -- Mitsubishi --.

Signed and Sealed this

Twenty-eighth Day of November, 2006

JON W. DUDAS
*Director of the United States Patent and Trademark Office*